(12) United States Patent
Tarukawa et al.

(10) Patent No.: US 12,738,137 B2
(45) Date of Patent: Sep. 15, 2026

(54) DISPLAY DEVICE, DISPLAY METHOD, AND DISPLAY PROGRAM

(71) Applicant: SATURN LICENSING LLC, New York, NY (US)

(72) Inventors: Kasumi Tarukawa, Tokyo (JP); Kazuhiko Sayama, Chiba (JP); Yohei Nakajima, Kanagawa (JP); Toshihiko Fushimi, Tokyo (JP); Naoko Abe, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 18/718,543

(22) PCT Filed: Nov. 28, 2022

(86) PCT No.: PCT/JP2022/043663

§ 371 (c)(1),
(2) Date: Jun. 11, 2024

(87) PCT Pub. No.: WO2023/120044

PCT Pub. Date: Jun. 29, 2023

(65) Prior Publication Data

US 2025/0046169 A1 Feb. 6, 2025

(30) Foreign Application Priority Data

Dec. 20, 2021 (JP) ................................ 2021-206386

(51) Int. Cl.
*G08B 21/02* (2006.01)
*G06T 7/70* (2017.01)
*H04N 21/431* (2011.01)

(52) U.S. Cl.
CPC ................ *G08B 21/02* (2013.01); *G06T 7/70* (2017.01); *H04N 21/4312* (2013.01); *H04N 21/4318* (2013.01); *G06T 2207/30196* (2013.01)

(58) Field of Classification Search
None
See application file for complete search history.

(56) References Cited

U.S. PATENT DOCUMENTS

2008/0309757 A1* 12/2008 Wan ................ H04N 21/42204 348/61
2012/0127325 A1* 5/2012 Lai ...................... H04N 23/611 348/207.1

(Continued)

FOREIGN PATENT DOCUMENTS

CN 111654751 A 9/2020
CN 113423013 A 9/2021

(Continued)

OTHER PUBLICATIONS

International Search Report for PCT/JP2022/043663 mailed Feb. 14, 2023; 3 pages.

*Primary Examiner* — John F Mortell
(74) *Attorney, Agent, or Firm* — Richard LaPeruta

(57) ABSTRACT

A display device (100) includes: a display control unit (131) that displays a video on a display unit (20); a determination unit (133) that determines whether or not a person visually recognizing the display unit is closer to the display unit than at a predetermined distance based on information acquired by a sensor; and an output control unit (134) that outputs a first warning to the person when the determination unit determines that the person is closer to the display unit than at a predetermined distance.

20 Claims, 15 Drawing Sheets

(56) References Cited

U.S. PATENT DOCUMENTS

2012/0147156 A1* 6/2012 Aizawa ................ H04N 13/144
348/51
2012/0218179 A1 8/2012 Oba
2015/0190048 A1* 7/2015 Huang ................. A61B 3/0033
351/239
2016/0026241 A1* 1/2016 Leung ..................... G06F 3/012
345/156
2019/0227636 A1 7/2019 Lopez Gil

FOREIGN PATENT DOCUMENTS

JP H08317304 A 11/1996
JP 2006013938 A 1/2006
JP 2011059528 A 3/2011
JP 2014078956 A 5/2014
JP 2018005663 A 1/2018
JP 2019003332 A 1/2019
JP 2021035826 A 3/2021

* cited by examiner 100
30
20
34
Move away
32
100
50

100
20
34
30
32
Move away
PLEASE MOVE AWAY TO WATCH THE TELEVISION
40
36
38
42
100
50

100
20
68
62
64
66
67
50
MEASUREMENT
RETURN
MOVE TO POSITION WHERE YOU WOULD LIKE TO BE INFORMED, AND PRESS MEASUREMENT BUTTON
WHEN PLURALITY OF PEOPLE APPEARS, PERSON CLOSE TO TV IS TARGETED.

| SETTING ID | SETTING DISTANCE | ... |
|---|---|---|
| ... | ... | ... |
| A01 | 1.0m | ... |
| A02 | 2.4m | ... |
| A03 | 3.0m | ... |
| ... | ... | ... |

| WARNING INFORMATION ID | WARNING INFORMATION | ... |
|---|---|---|
| ... | ... | ... |
| E01 | F01 | ... |
| E02 | F02 | ... |
| E03 | F03 | ... |
| ... | ... | ... |

88
S301
86

90
86
S302

DISPLAY DEVICE, DISPLAY METHOD, AND DISPLAY PROGRAM

CROSS-REFERENCE TO RELATED APPLICATIONS

This application is a national phase entry under 35 U.S.C. § 371 of International Application No. PCT/JP2022/043663 filed Nov. 28, 2022, which claims the priority from Japanese Patent Application No. 2021-206386 filed in the Japanese Patent Office on Dec. 20, 2021, the entire contents of which are hereby incorporated by reference.

FIELD

The present disclosure relates to a display device, a display method, and a display program for detecting approach to a target and issuing a warning about the approach.

BACKGROUND

In recent years, expansion of the market of large-sized televisions has increased opportunities for installing a large-sized television in a living room of a home and the like. Children tend to be particularly immersed in a video, and thus tend to approach and watch a large-sized television. This may cause loss of visual acuity of children, collision with a device, and a risk of falling.

In this regard, there has been proposed a technique of preventing a child from approaching a device by detecting that the child is located near a television and issuing a warning at the time when the detection is performed more than a predetermined number of times (e.g., Patent Literature 1).

CITATION LIST

Patent Literature

Patent Literature 1: JP 2014-78956 A

SUMMARY

Technical Problem

Televisions introduced into homes are expected to be increased in size in the future. Continuing to take measures is necessary for preventing proximity to the televisions.

Therefore, the present disclosure proposes a display device, a display method, and a display program capable of more effectively inhibiting approach of a person to a predetermined target.

Solution to Problem

An display device according to one embodiment of the present disclosure includes a display control unit that displays a video on a display unit; a determination unit that determines whether or not a person visually recognizing the display unit is closer to the display unit than at a predetermined distance based on information acquired by a sensor; and an output control unit that outputs a first warning to the person when the determination unit determines that the person is closer to the display unit than at a predetermined distance.

DESCRIPTION OF EMBODIMENTS

An embodiment will be described in detail below with reference to the drawings. Note that, in the following embodiment, the same reference signs are attached to the same parts to omit duplicate description.

The present disclosure will be described in the following item order.

1. Embodiment
1-1. Outline of Display Processing According to Embodiment
1-2. Configuration of Display Device According to Embodiment
1-3. Procedure of Display Processing According to Embodiment
1-4. Variation According to Embodiment
2. Other Embodiments
3. Effects of Display Device According to Present Disclosure
4. Hardware Configuration

1. Embodiment (1-1. Outline of Display Processing According to Embodiment)

Figure 1:
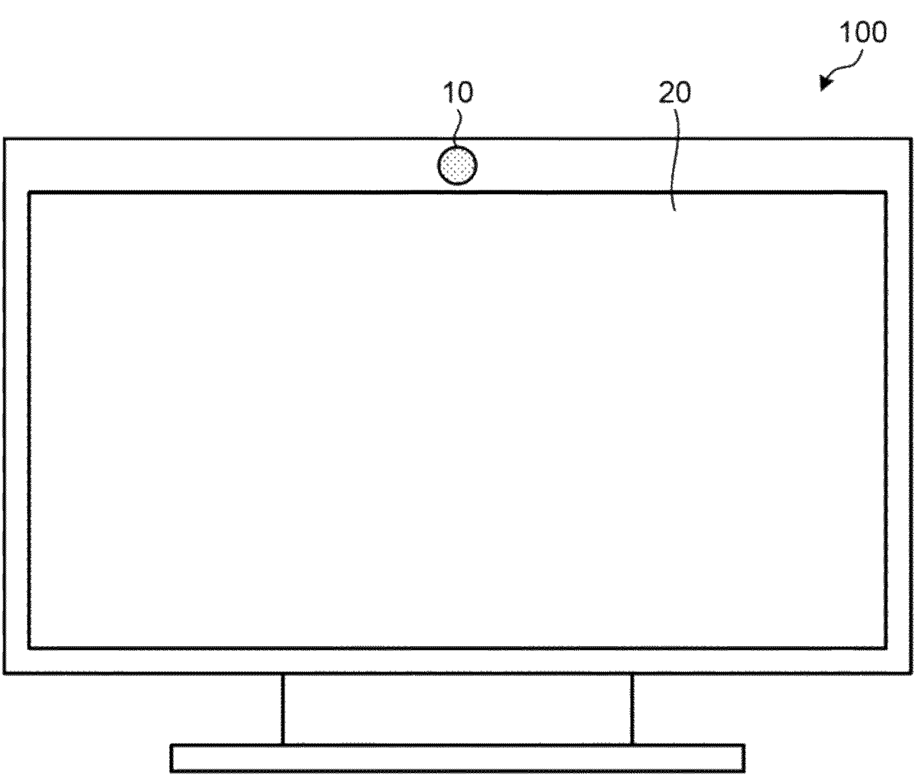
FIG. 1 outlines a display device according to an embodiment.

A display device 100 that executes display processing according to the present disclosure will be described with reference to FIG. 1. FIG. 1 outlines the display device 100 according to the embodiment. Specifically, FIG. 1 is a front view of the display device 100 according to an embodiment, and illustrates components of the display device 100.

As illustrated in FIG. 1, the display device 100 is a so-called television including a display unit 20 that displays a still image or a moving image. The display device 100 includes a camera 10 that captures an image in an upper portion of the display unit 20. The camera 10 captures an image in a direction in which a still image or a moving image is displayed on the display unit 20. The display device 100 analyzes the image captured by the camera 10, and determines whether or not a person (hereinafter, collectively referred to as "user") appears in the image.

Furthermore, the display device 100 analyzes the captured image, and measures the distance between the user and the camera 10 (i.e., distance between user and display unit 20). Then, when the user comes closer to the display unit 20 than at a predetermined distance, the display device 100 issues a warning to avoid proximity. As a result, the display device 100 prevents the user from approaching the display unit 20, and prevents a decrease in visual acuity of the user, a collision with the display device 100, and a fall of the display device 100.

Specifically, the display device 100 displays, on the display unit 20, an image sending a message to move away from the display device 100, and emits a warning voice from a speaker (not illustrated in FIG. 1). The processing will be described with reference to FIG. 2 and subsequent drawings.

Figure 2:
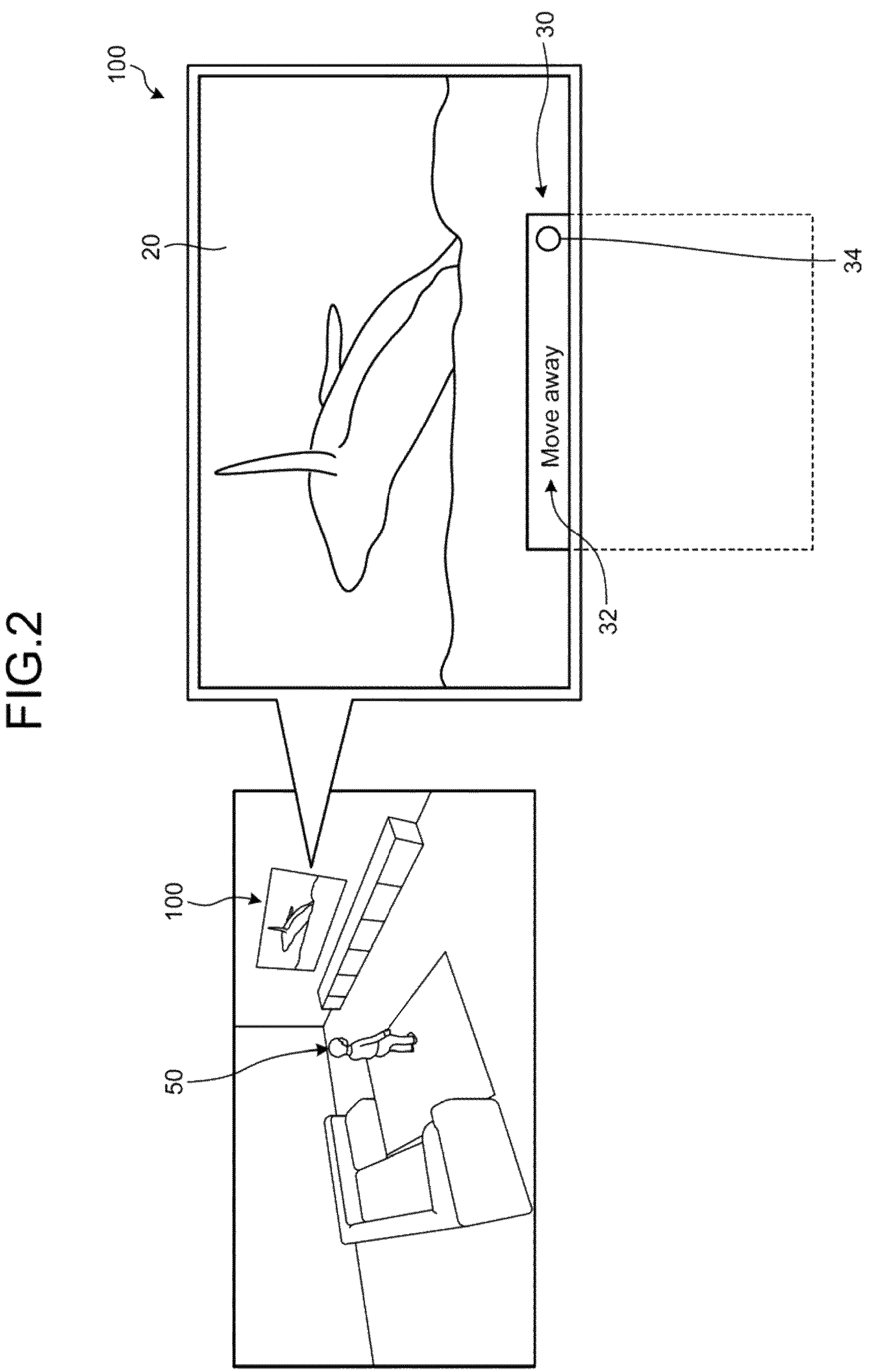
FIG. 2 is a diagram (1) illustrating display processing according to the embodiment.

FIG. 2 is a diagram (1) illustrating the display processing according to the embodiment. FIG. 2 illustrates the display device 100 and a user 50. The display device 100 is installed in a living room. The user 50 is a child watching video content displayed on the display device 100.

In the example of FIG. 2, the user 50 is close to the display device 100 beyond a preset and predetermined distance. At this time, the display device 100 determines that the user 50 is watching the display unit 20 and the user 50 is closer to the display unit 20 than at a predetermined distance based on image recognition processing performed on the image captured by the camera 10.

In this case, the display device 100 displays a first warning to the user 50 on the display unit 20. Specifically, the display device 100 displays a warning frame 30 in a lower portion of the display unit 20.

The warning frame 30 includes a warning message 32 (characters of "Move away" in example of FIG. 2) and a cancel button 34. The warning message 32 gives an instruction to move away from a screen. Note that, at a stage of displaying the first warning in FIG. 2, only a part of the warning frame 30 is displayed in the lower portion of the display unit 20. The actual warning frame 30 has a wider display range as illustrated by a dotted line in FIG. 2.

The user 50 or a guardian user watching the display unit 20 together with the user 50 is prompted to move away from the display unit 20 by the warning frame 30 displayed on the display unit 20 which the user 50 or the guardian user is watching. Note that, when desiring to cancel warning processing according to the embodiment, the guardian of the user 50 and the like can delete the warning frame 30 by pressing the cancel button 34, and can temporarily cancel processing related to the warning.

The display device 100 continues to measure the distance to the user 50 even after giving the first warning in which the warning frame 30 is displayed in the lower portion of the display unit 20. Then, when the user 50 is still located within a predetermined distance from the display unit 20 after a predetermined time (e.g., three seconds after warning frame 30 is displayed) has elapsed, the display device 100 issues a second warning. The second warning will be described with reference to FIG. 3.

Figure 3:
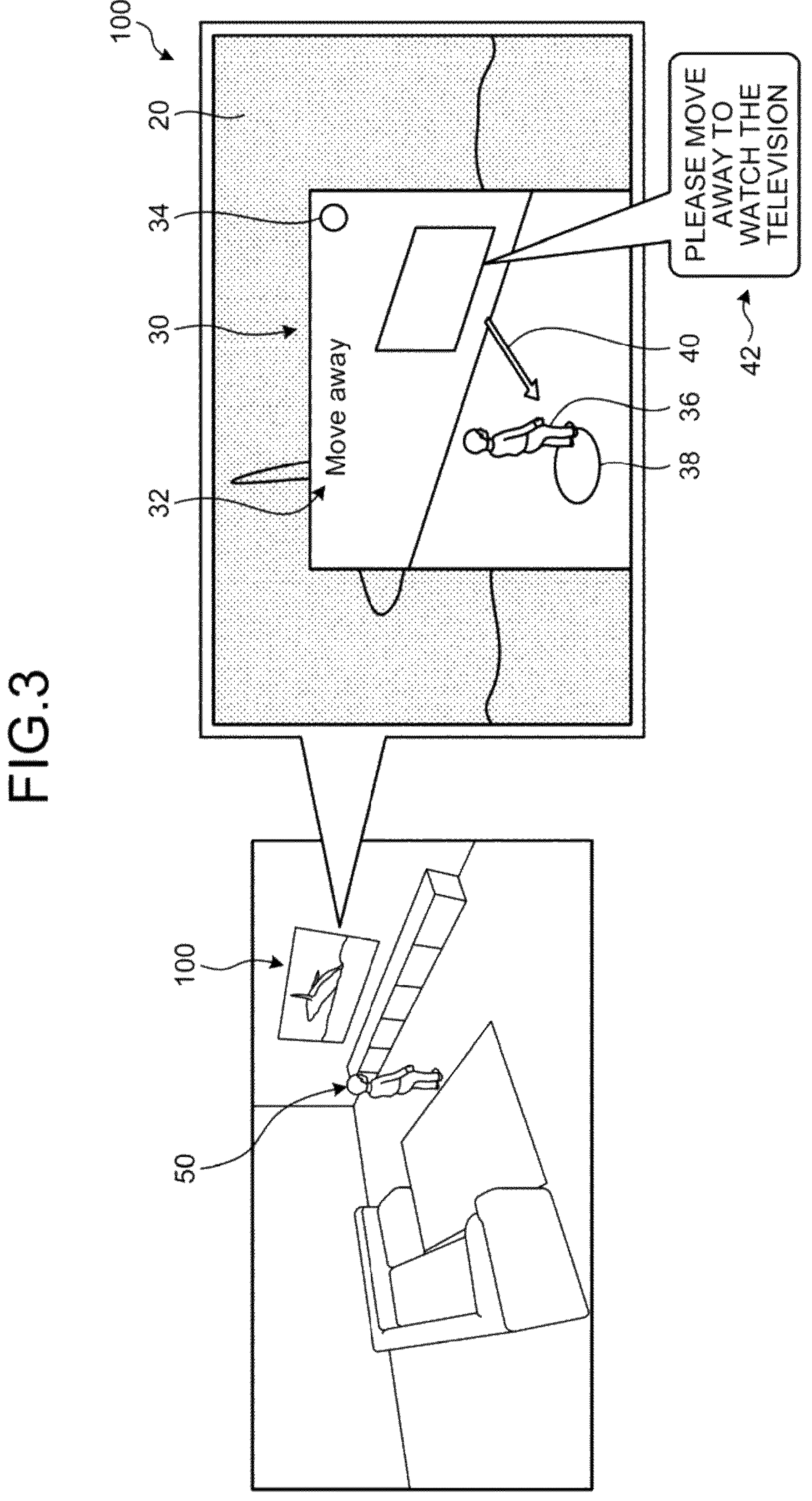
FIG. 3 is a diagram (2) illustrating the display processing according to the embodiment.

FIG. 3 is a diagram (2) illustrating the display processing according to the embodiment. FIG. 3 illustrates the user 50 continuing to be close to the display device 100.

At this time, the display device 100 displays the entire warning frame 30 on the display unit 20 as the second warning. For example, the display device 100 performs animation display. In the animation display, the warning frame 30 slides upward from the state in which a part of the warning frame 30 is displayed. The display device 100 causes the screen to transition so that the entire warning frame 30 is displayed on the display unit 20.

In addition to the warning message 32 and the cancel button 34, the warning frame 30 contains a virtual video for prompting the user 50 to move away from the screen. The virtual video is obtained by comparing the user 50 to a character 36 and virtually displaying the distance between the user 50 and the display unit 20 in real space on the screen. In addition to the character 36, the virtual video contains an appropriate position display 38 and an arrow 40 for prompting a movement direction. These displays are automatically formed based on information captured by the camera 10.

Note that the display device 100 may perform processing of, for example, darkening, in stages, an original video (video hidden behind warning frame 30) displayed on the display unit 20 so far together with the entire display of the warning frame 30. This causes a line of sight of the user 50 to be attracted not to a standard video which has been displayed so far but to the warning frame 30. At the same time, the display device 100 may output a warning voice 42 such as "Please move away to watch television".

The character 36 on the screen is in conjunction with the movement of the user 50 in the real space. That is, when the user 50 moves away from the display unit 20, the character 36 moves in the direction indicated by the arrow 40 together with animation processing. Furthermore, when the user 50 further approaches the display unit 20, the character 36 moves in a direction opposite to the direction indicated by the arrow 40 together with animation processing.

The user 50 grasps that the character 36 on the screen moves if the user himself/herself moves, and further hears a warning voice uttered from the display device 100 such as "Please move backward to a circle on the screen". The user 50 is thereby motivated to move to the appropriate position display 38. The display device 100 thereby inhibits the user 50 from coming close to the display device 100. Note that the display device 100 may highlight the appropriate position display 38 on the screen (e.g., blink appropriate position display 38 or display appropriate position display 38 more brightly than other display) to prompt the user 50 to move to the appropriate position display 38.

Figure 4:
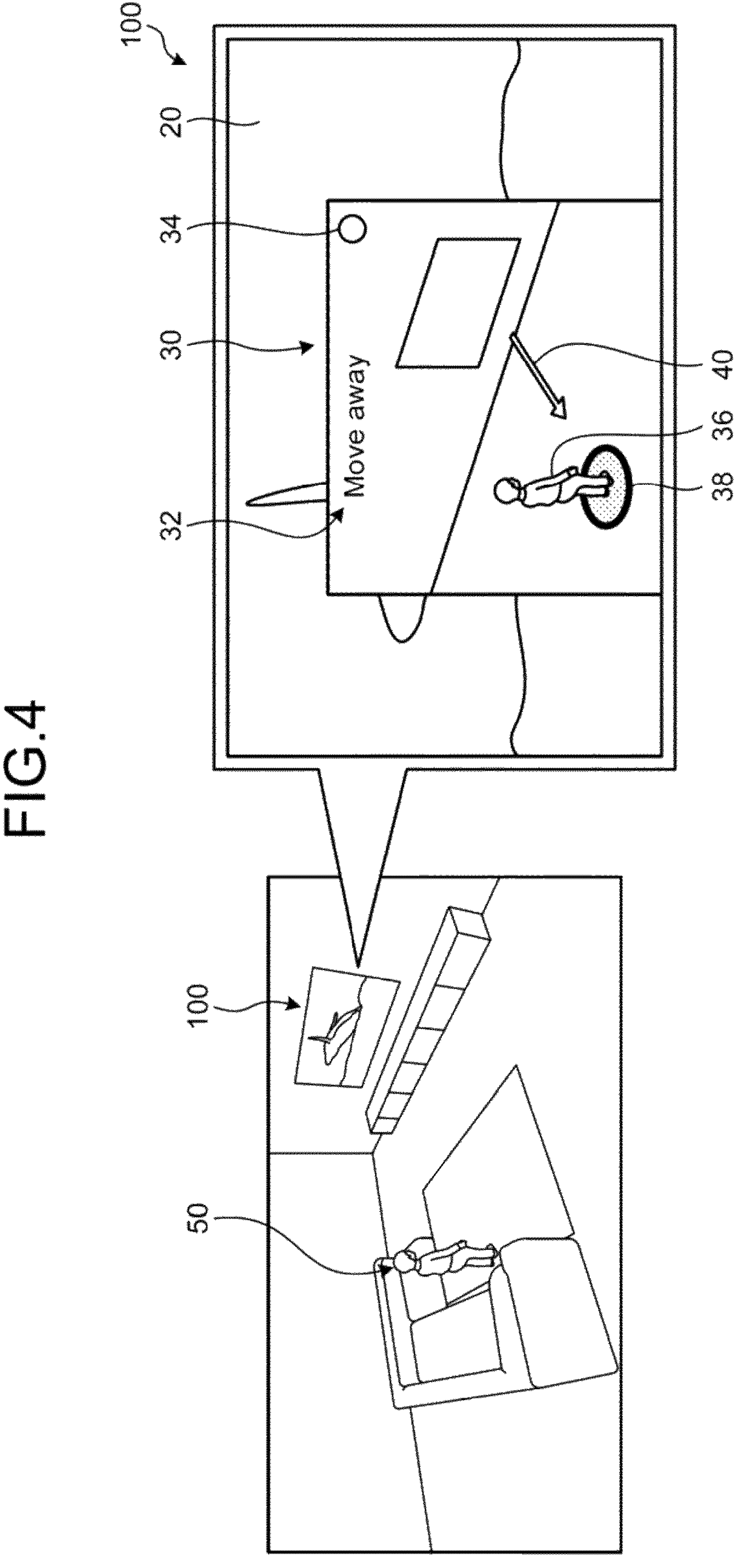
FIG. 4 is a diagram (3) illustrating the display processing according to the embodiment.

Processing in a case where the user 50 has moved away from the display device 100 in accordance with the second warning will be described with reference to FIG. 4. FIG. 4 is a diagram (3) illustrating the display processing according to the embodiment. FIG. 4 illustrates an example in which the user 50 has moved to the outside of the range of the predetermined distance where a warning is issued.

When the character 36 in the virtual video moves to the appropriate position display 38, the display device 100 performs effect processing such as turning on or blinking the appropriate position display 38, slides the warning frame 30 to the lower portion of the display unit 20, and then deletes the warning frame 30 from the display unit 20. Furthermore, when deleting the warning frame 30, the display device 100 returns the darkened video of the display unit 20 to standard display.

The processing enables the user 50 to recognize that his/her action returns the screen display to original display, so that the user 50 can change his/her action hereafter so as not to come close to the display unit 20. That is, the display processing according to the embodiment can prevent the user 50 from coming close to the display unit 20 while discouraging the user 50 from coming close to the display unit 20 hereafter, so that a high effect can be exhibited in proximity prevention.

The display processing executed by the display device 100 has been described above. Incidentally, it is desirable that the user can optionally determine a level of proximity to the display device 100 at which a warning is to be issued in accordance with the size of a room in which the display device 100 is installed, the age of the user, and the like.

Therefore, the display device 100 executes measurement processing so that the user can optionally set the predetermined distance in which a warning is issued. This point will be described with reference to FIG. 5 and the subsequent drawings.

Figure 5:
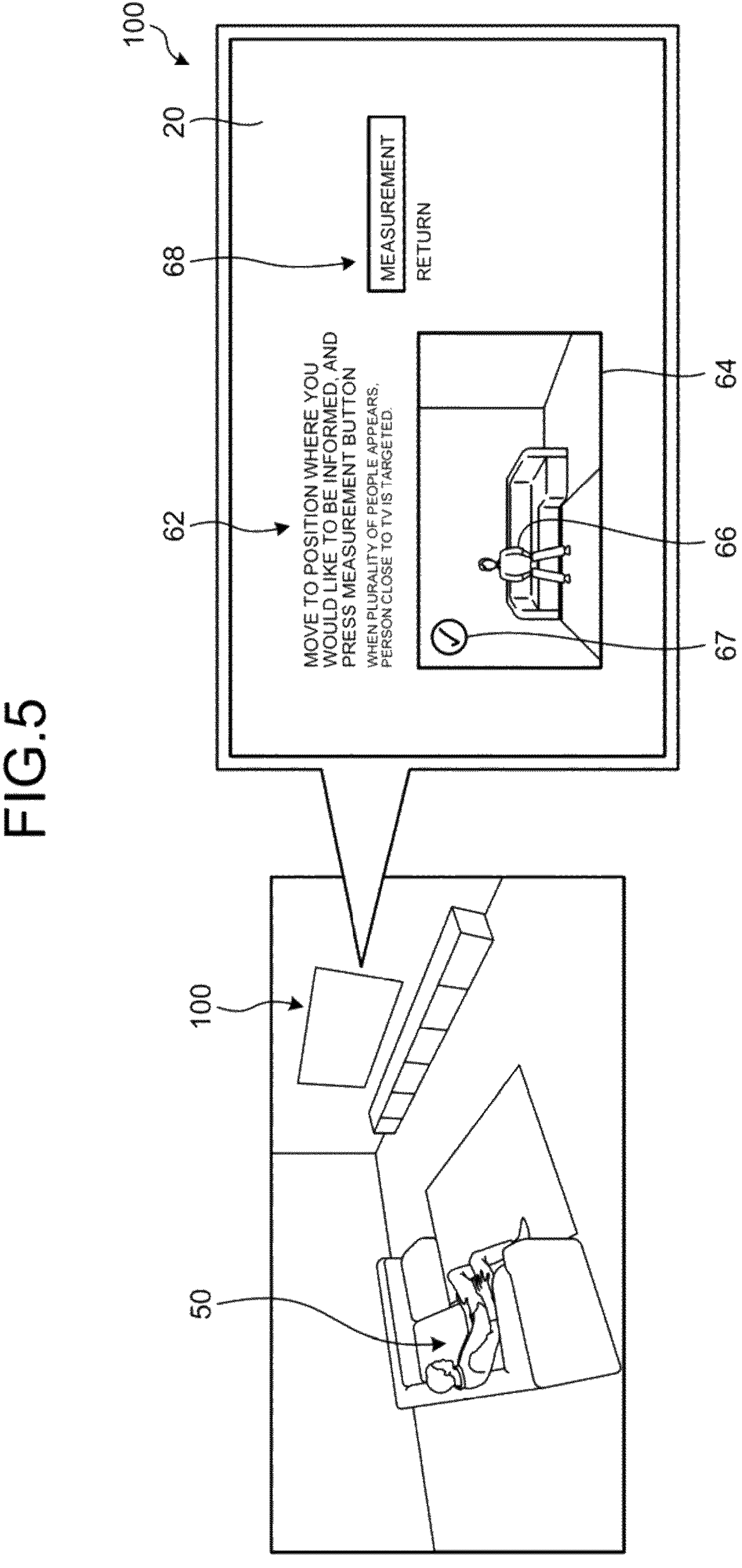
FIG. 5 is a diagram (1) illustrating measurement processing according to the embodiment.

FIG. 5 is a diagram (1) illustrating the measurement processing according to the embodiment. FIG. 5 illustrates the display device 100 and an adult user 60, who intends to set the predetermined distance in which a warning is issued.

When receiving a predetermined distance setting request from the user 60, the display device 100 provides a setting screen serving as a user interface related to the setting. For example, as illustrated in FIG. 5, the display device 100 displays, on the display unit 20, an instruction sentence 62, a captured image display 64, and a measurement start button 68. The instruction sentence 62 contains text prompting measurement. The captured image display 64 is provided by the camera 10.

The captured image display 64 is an image obtained by the camera 10 capturing the user 60 who intends to set the predetermined distance. That is, the captured image display 64 contains a person 66 corresponding to the imaged user 60.

The user 60 moves to a reference position where a warning is issued if the user comes close to the display device 100 beyond the position, and presses the measurement start button 68. For example, the user 60 is located at a position where the user 60 himself/herself watches the display device 100 on a daily basis, and presses the measurement start button 68. At this time, for example, the display device 100 displays a measurement possibility determination 67 indicating whether the measurement processing can be started.

Figure 6:
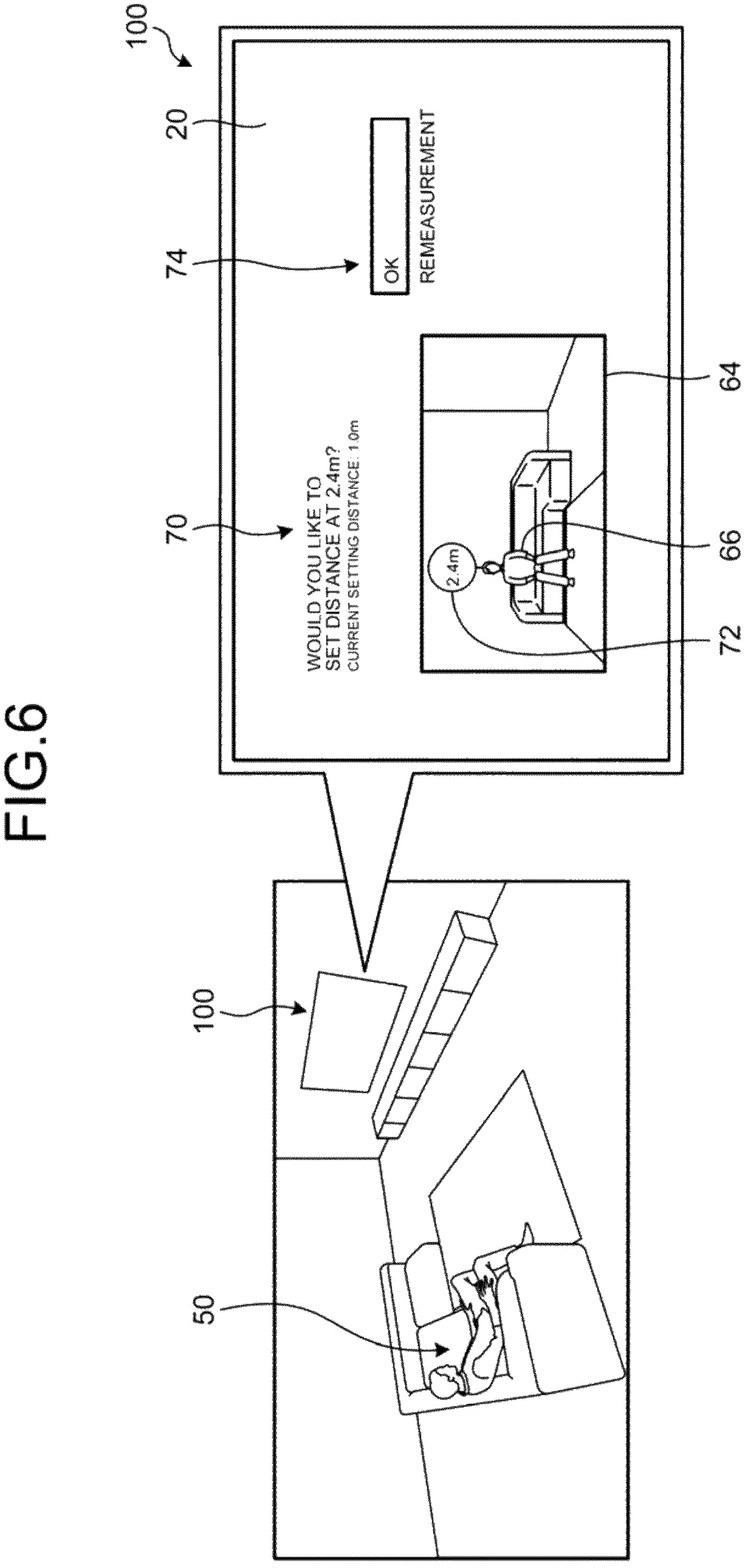
FIG. 6 is a diagram (2) illustrating the measurement processing according to the embodiment.

When the user 60 presses the measurement start button 68, the display device 100 analyzes the image captured by the camera 10, and measures a distance to the user 60. The processing will be described with reference to FIG. 6. FIG. 6 is a diagram (2) illustrating the measurement processing according to the embodiment.

As illustrated in FIG. 6, when ending the measurement of the distance to the user 60, the display device 100 displays, on the display unit 20, an instruction sentence 70 for asking whether or not to set the measured distance as the predetermined distance. Furthermore, the display device 100 displays, on the captured image display 64, a measurement result 72 obtained by measuring the distance to the person 66. The measurement result 72 is obtained by measuring the distance from the display device 100 to the person 66, and displayed near the person 66. This enables the user 60 to grasp that the person 66 corresponding to the user 60 himself/herself is accurately recognized and that the distance to the person 66 is accurately measured while watching the screen of the display device 100.

When setting the measurement result as the predetermined distance, the user 60 presses a determination button 74. Note that the user 60 may request remeasurement in a situation where the user 60 himself/herself has not been recognized, an appropriate distance has not been measured, or the user would like to set a longer or shorter distance. Furthermore, for example, when the user 60 would like to set a distance slightly shorter or slightly longer than the measured distance as the predetermined distance, the user 60 may set the predetermined distance by manually adjusting the measured distance.

When the user sets a predetermined distance, the display device 100 stores setting information as the predetermined distance in which a warning is issued. Note that the display device 100 may store setting of a different predetermined distance for each user who has set the distance or for each room in which the setting has been performed. Furthermore, for example, the measurement result and the setting information may be able to be uploaded to a cloud server via a network and imported to another piece of equipment. The display device 100 may import a measurement result and setting information generated by another piece of equipment from the cloud server.

As described above, as illustrated in FIGS. 1 to 6, the display device 100 displays a video on the display unit 20, and determines whether or not the user visually recognizing the video is closer to the display unit 20 than at a predetermined distance. Then, when determining that the user is closer to the display unit 20 than at a predetermined distance, the display device 100 issues, to the user, the first warning in which the warning frame 30 is displayed on a part of the display unit 20. Moreover, when the user stays within the predetermined distance after a predetermined time has elapsed since the first warning was issued, the display device 100 issues the second warning in which the entire warning frame 30 is displayed.

As described above, the display device 100 recognizes the user visually recognizing a video by using an image, and issues a warning to the recognized user. The display device 100 can thereby reliably issue a warning to the user visually recognizing the vide without reacting a user simply passing in front of the display device 100, an animal other than a human, and the like. Furthermore, the display device 100 can prompt the user to return to a standard video by issuing a warning in stages so as to cover the display unit 20, so that the display device 100 can effectively inhibit the user from approaching the display device 100.

(1-2. Configuration of Display Device According to Embodiment)

Figure 7:
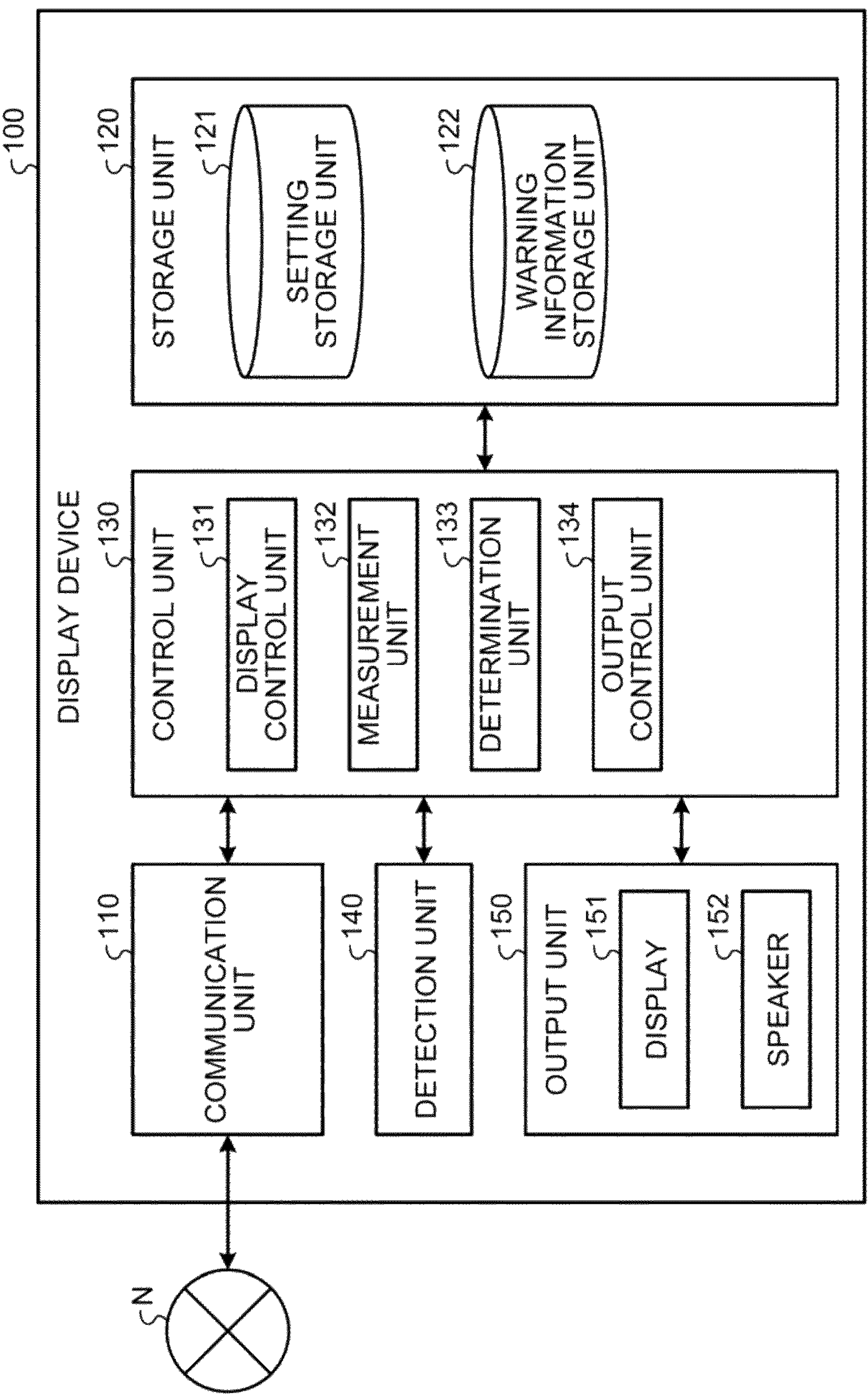
FIG. 7 illustrates a configuration example of the display device according to the embodiment.

Next, a configuration of the display device 100 will be described. FIG. 7 illustrates a configuration example of the display device 100 according to the embodiment.

As illustrated in FIG. 7, the display device 100 includes a communication unit 110, a storage unit 120, a control unit 130, a detection unit 140, and an output unit 150. Note that the display device 100 may include an input unit (e.g., touch display and operation button) for receiving various operations from an administrator who manages the display device 100, the user 50, and the like.

The communication unit 110 is implemented by, for example, a network interface card (NIC) and a network interface controller. The communication unit 110 is connected to a network N by wire or wirelessly, and transmits and receives information to and from an external device and the like via the network N. The network N is implemented by a wireless communication standard or system such as Bluetooth (registered trademark), the Internet, Wi-Fi (registered trademark), ultra wide band (UWB), and low power wide area (LPWA).

The detection unit 140 is a functional unit (sensor) for detecting various pieces of information. The detection unit 140 is, for example, an image sensor that records imaged space as pixel information (still image or moving image). That is, the camera 10 in FIG. 1 corresponds to one example of the detection unit 140. Specifically, the camera 10 is an image sensor that images a direction facing the display unit 20. As illustrated in FIG. 1, the camera 10 is disposed so as to be close to the display unit 20 (In example of FIG. 1, disposed so as to be embedded in outer frame (bezel) of display unit 20).

Note that the image sensor (camera 10) according to the present disclosure may include an AI chip in which prior learning has been performed for recognizing an image of a face of a human and estimating the skeleton of the user based on image analysis.

Furthermore, the detection unit 140 may include a depth sensor (ToF sensor) and a microphone. The depth sensor (ToF sensor) measures a distance to a user or an object located in space. The microphone detects sound in the space.

Furthermore, the detection unit 140 is not necessarily required to be provided inside the display device 100. For example, the detection unit 140 may be installed outside the display device 100 as long as the detection unit 140 can transmit information sensed by using communication and the like to the display device 100.

The output unit 150 is a functional unit that outputs a video, voice, and the like to the outside. For example, the output unit 150 includes a display 151 and a speaker 152. The display 151 displays a video. The speaker 152 outputs voice. The display unit 20 in FIG. 1 corresponds to one example of the output unit 150.

The storage unit 120 is implemented by, for example, a semiconductor memory element, such as a random access memory (RAM) and a flash memory, or a storage device, such as a hard disk and an optical disk. The storage unit 120 includes a setting storage unit 121 and a warning information storage unit 122. Each storage unit will be sequentially described below with reference to FIGS. 8 and 9.

Figure 8:
FIG. 8 illustrates one example of a setting storage unit according to the embodiment.

FIG. 8 illustrates one example of the setting storage unit 121 according to the embodiment. As illustrated in FIG. 8, the setting storage unit 121 contains items such as "setting ID" and "setting distance". Note that, although FIGS. 8 and 9 may conceptually illustrate information stored in the storage unit 120 as "A01", actually, the storage unit 120 stores each piece of information to be described later.

The "setting ID" is identification information for identifying a setting of a distance (predetermined distance) serving as a reference for determining proximity to the display unit 20. The "setting distance" is information on the predetermined distance set for determining that a person has come close to the display unit 20. For example, the setting distance may be set for each user who uses the display device 100, or may be differently used for each piece of space such as a room in which the display device 100 is installed.

Figure 9:
FIG. 9 illustrates one example of a warning information storage unit according to the embodiment.

FIG. 9 illustrates one example of the warning information storage unit 122 according to the embodiment. As illustrated in FIG. 9, the warning information storage unit 122 contains items such as "warning information ID" and "warning information".

The "warning information ID" is identification information for identifying warning information used for the display processing. The "warning information" includes image data of a warning screen used for warning, warning voice data, and data in which operation processing such as how an image changes is written.

Returning to FIG. 7, the description will be continued. The control unit 130 is implemented by, for example, a central processing unit (CPU), a micro processing unit (MPU), and a graphics processing unit (GPU) executing a program (e.g., display program according to present disclosure) stored in the display device 100 by using a random access memory (RAM) or the like as a work area. Furthermore, the control unit 130 is a controller, and may be implemented by an integrated circuit such as an application specific integrated circuit (ASIC) and a field programmable gate array (FPGA).

As illustrated in FIG. 7, the control unit 130 includes a display control unit 131, a measurement unit 132, a determination unit 133, and an output control unit 134.

The display control unit 131 performs control so that a video is displayed on the display unit 20 (display 151) by outputting the video to the output unit 150.

When receiving a distance measurement request from the user, the measurement unit 132 measures the distance from the user located in a detection range of a sensor to the display unit 20 based on information acquired by the sensor. Furthermore, when receiving a predetermined distance setting request after the measurement, the measurement unit 132 sets the measured distance as a predetermined distance. When setting the predetermined distance, the measurement unit 132 stores the information in the setting storage unit 121.

Specifically, the measurement unit 132 measures the distance from the user located in the detection range (view angle range) of the camera 10 to the display unit 20 based on analysis of an image captured by the camera 10. The distance is measured based on existing image analysis processing (processing executed by AI chip incorporated in camera 10 and like).

When measuring the distance, the measurement unit 132 provides a user interface to be displayed on the display unit 20 as illustrated in FIGS. 4 and 5. The user interface includes an image captured by the camera 10 (i.e., image indicating situation in which display device 100 is imaging user). Furthermore, when the measurement of the distance is completed, a result of measuring the distance from the user located in the detection range of the camera 10 to the display unit 20 is displayed on the user interface. The measurement result is superimposed on the image captured by the camera 10.

The measurement unit 132 receives whether or not to set the measurement result as the predetermined distance via the user interface. The user can easily and appropriately set the predetermined distance by performing the setting while watching the user interface. The user can check a situation in which the user himself/herself is being imaged and the measured distance at a glance on the user interface.

As described above, the camera 10 includes the AI chip having a prior learning model in which a specific target such as human face recognition has been learned, so that the camera 10 can recognize whether an imaged target is a human or not. The measurement unit 132 acquires a flag of "whether person is located in angle of view or not" from the camera 10. When a person is located in the angle of view, the measurement unit 132 measures the distance to the person. Note that, when a plurality of people is located in the angle of view, the measurement unit 132 may measure the distance to a person closest to the display unit 20, or may return an error.

The determination unit 133 determines whether or not the user visually recognizing the display unit 20 is closer to the display unit 20 than at a predetermined distance based on information acquired by the sensor (detection unit 140).

Specifically, the determination unit 133 determines whether or not the user is closer to the display unit 20 than at a predetermined distance based on analysis of the image captured by the camera 10.

At this time, the determination unit 133 may determine whether or not the user is visually recognizing the display unit 20 based on skeleton estimation (bone estimation) of the user recognized in the image. This is because there is no need to issue a warning if the user is not gazing at the display unit 20. Specifically, when determining that a user face appearing in the camera 10 is directed sideways or backward based on the skeleton estimation, the determination unit 133 determines that the user is not visually recognizing the display unit 20. This enables the determination unit 133 to exclude, from a warning target, a user simply passing in front of the display device 100 and a user who is not gazing at the display unit 20.

Furthermore, the determination unit 133 may determine whether or not the user visually recognizing the display unit 20 meets a predetermined reference based on the skeleton estimation (bone estimation) of the user recognized in the image. This is because there is a case where a warning to the user visually recognizing the display unit 20 is unnecessary. Specifically, when determining that the user appearing in the camera 10 is under a predetermined age based on the skeleton estimation or that the user has been preset, the determination unit 133 determines that the user is a warning target. This enables the determination unit 133 to set only a user who needs a warning as a warning display target.

When the determination unit 133 determines that the user visually recognizing the display unit 20 is closer to the display unit 20 than at a predetermined distance, the first warning is issued as illustrated in FIG. 2. In the first warning, the warning frame 30 is partially displayed on the display unit 20. Moreover, the determination unit 133 determines whether or not the user continues to be closer to the display unit 20 than at a predetermined distance for a predetermined time (e.g., three seconds) after the first warning was output. When the determination unit 133 determines that the user continues to be closer to the display unit 20 than at a predetermined distance for a predetermined time after the first warning was output, the second warning is given. Furthermore, when the determination unit 133 determines that the user is further closer to the display unit 20 after the first warning was output, the second warning may be given without waiting for the elapse of the predetermined time.

When the determination unit 133 determines that the user is closer to the display unit 20 than at a predetermined distance, the output control unit 134 outputs the first warning to the user. Note that, when the determination unit 133 determines that the user is closer to the display unit 20 than at a predetermined distance and determines that the user is visually recognizing the display unit 20, the output control unit 134 may output the first warning to the user.

For example, the output control unit 134 outputs, as the first warning, a second warning screen (corresponding to part of warning screen. For example, the warning frame 30 in FIG. 2 corresponds to the second warning screen) such that second warning screen is superimposed on at least a part of a video displayed on the display unit 20. The second warning screen has a smaller display area than a first warning screen (corresponding to entire warning screen. For example, the warning frame 30 entirely displayed as in FIG. 3 corresponds to the first warning screen).

Moreover, when the determination unit 133 determines that the user continues to be closer to the display unit 20 than at a predetermined distance for a predetermined time after the first warning, the output control unit 134 outputs the second warning to the user.

For example, after the first warning is output, the output control unit 134 outputs, as the second warning, the first warning screen on which an instruction to move away from the display unit is displayed based on the information acquired by the sensor. Specifically, the output control unit 134 outputs, as the second warning, the entire warning screen on which the instruction to move away from the display unit 20 is displayed so that the entire warning screen is superimposed on a video displayed on the display unit 20. That is, the output control unit 134 first displays, as the first warning, the second warning screen corresponding to a part of the first warning screen, and then displays, as the second warning, the first warning screen, which is the entire warning screen.

Moreover, the output control unit 134 may output the entire warning screen while outputting a voice instruction (warning voice) to move away from the display unit 20.

Furthermore, when displaying the entire warning screen, the output control unit 134 may output the entire warning screen to the display unit 20 together with animation display in which the warning screen only partially displayed on the display unit 20 is moved. For example, as illustrated in FIGS. 2 and 3, the output control unit 134 may perform output processing so that the entire warning frame 30 is displayed near the center of the display unit 20 by sliding the warning frame 30 displayed in the lower portion of the display unit 20 to the upper portion with the elapse of time.

At this time, the output control unit 134 may perform filter processing in conjunction with the elapse of time on the video on which the warning screen is superimposed. Specifically, the output control unit 134 may perform filter processing of gradually decreasing the luminance of the original video on which the warning screen is superimposed and darkening the original video. This motivates the user to quickly return to the original video, so that the user is prompted to move away from the display device 100. Note that the filter processing is not limited to luminance adjustment. Any piece of processing such as resolution change and mosaic processing may be adopted as long as the original video is changed.

Furthermore, as illustrated in FIGS. 2 and 3, the output control unit 134 may display, as the warning screen, a virtual video including a character corresponding to the user, a first object corresponding to the display unit 20, and a second object indicating a position more away from the display unit 20 than at a predetermined distance. Moreover, the output control unit 134 may cause the character to perform an animation operation in conjunction with the real distance between the user and the display unit 20.

Furthermore, when the determination unit 133 determines that the user has moved to a position more away from the display unit 20 than at a predetermined distance, the output control unit 134 may move the character to the second object in the virtual video in conjunction with the movement while performing predetermined effect processing on the second object. For example, the output control unit 134 performs effect processing of blinking the second object (mark indicating predetermined distance). This enables the display device 100 to motivate the user to move away from the display device 100 to actively perform the effect processing on the second object particularly when the user is a child.

When the determination unit 133 determines that the user has moved to a position more away from the display unit 20 than at a predetermined distance, the output control unit 134 deletes the warning screen from the display unit 20 together with animation display in which the warning screen is moved to the outside of the display unit 20.

Note that, when displaying a warning screen and then receiving, from the user, a request to stop output of the warning via the warning screen, the output control unit 134 may delete the warning screen from the display unit 20. For example, when the user presses the cancel button 34 in FIG. 2 on the screen, the output control unit 134 cancels the subsequent pieces of display processing, and deletes the warning screen.

(1-3. Procedure of Display Processing According to Embodiment)

Figure 10:
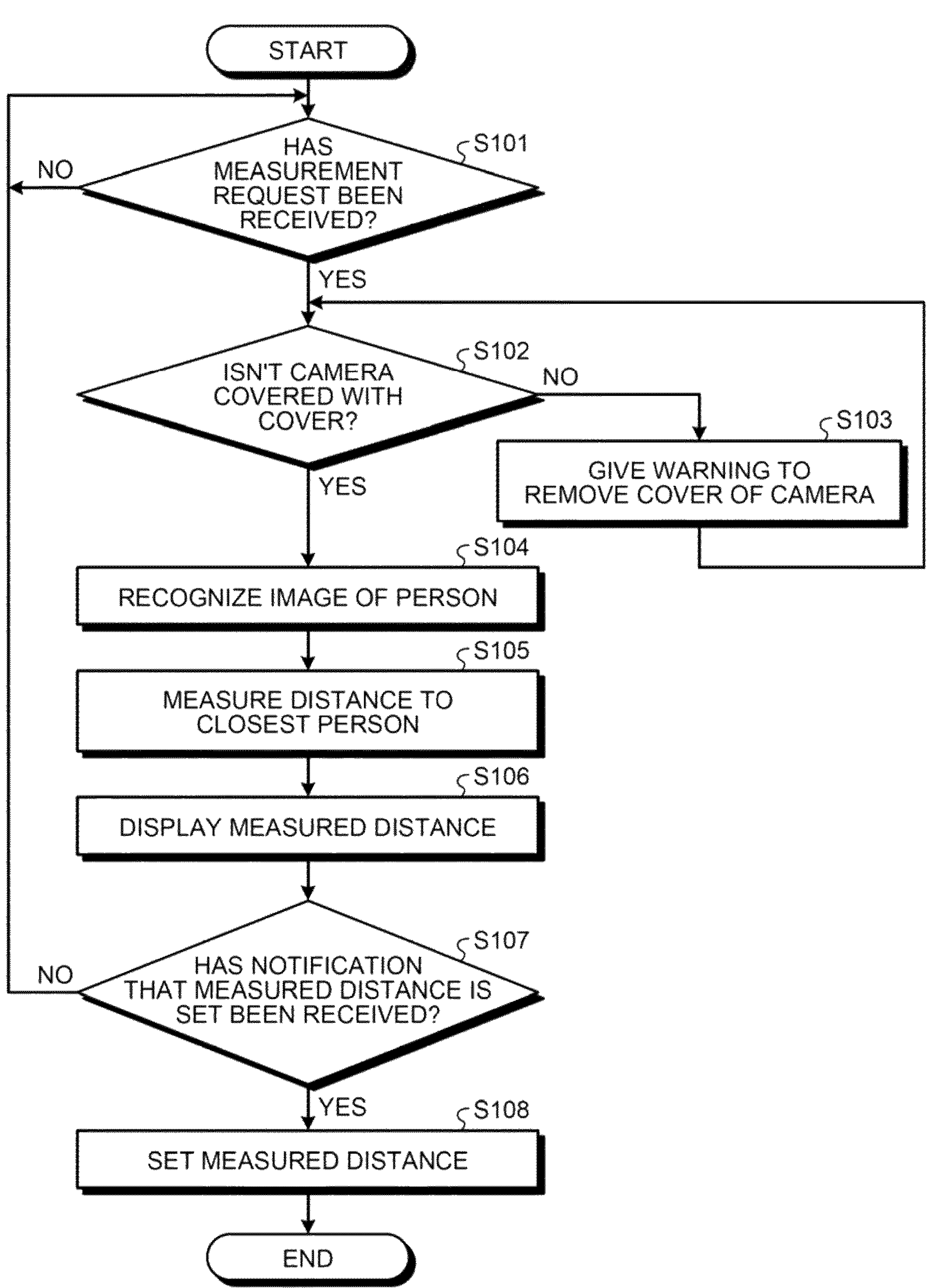
FIG. 10 is a flowchart illustrating a flow of the measurement processing according to the embodiment.

Next, a procedure of processing according to the embodiment will be described with reference to FIGS. 10 and 11. FIG. 10 is a flowchart illustrating a flow of measurement processing according to the embodiment.

As illustrated in FIG. 10, the display device 100 determines whether or not a measurement request has been received from the user (Step S101). For example, the display device 100 provides an initial setting screen of a predetermined distance at which proximity to the display device 100 is determined, and receives the measurement request from the user. When the measurement request has not been received (Step S101; No), the display device 100 stands by until the request is received.

In contrast, when the measurement request has been received (Step S101; Yes), the display device 100 checks whether the camera 10 provided in the display device 100 is not covered with a cover or the like (Step S102). When the camera 10 is covered (Step S102; No), the display device 100 warns the user to remove the cover of the camera 10 (Step S103).

When the camera 10 is not covered (Step S102; Yes), the display device 100 images the front of the display unit 20 with the camera 10, and recognizes an image of a person from the obtained image (Step S104).

Then, the display device 100 measures a distance to a person located at the closest distance from the display unit 20 (Step S105). The display device 100 displays the measured distance near the person in the image of the camera 10 reflected on the setting screen (user interface) (Step S106). Note that the "person" in this case may be the same as the user who has made the measurement request, or may be another person.

Thereafter, the display device 100 determines whether or not a message that the measured distance is set as a predetermined distance has been received from the user (Step S107). When the setting has not been received from the user (Step S107; No), the display device 100 receives a further measurement request. In contrast, when the setting has been received from the user (Step S107; Yes), the display device 100 sets the measured distance as a predetermined distance (Step S108).

Next, a procedure of the display processing according to the embodiment will be described with reference to FIG. 11. FIG. 11 is a flowchart illustrating a flow of the display processing according to the embodiment.

Figure 11:
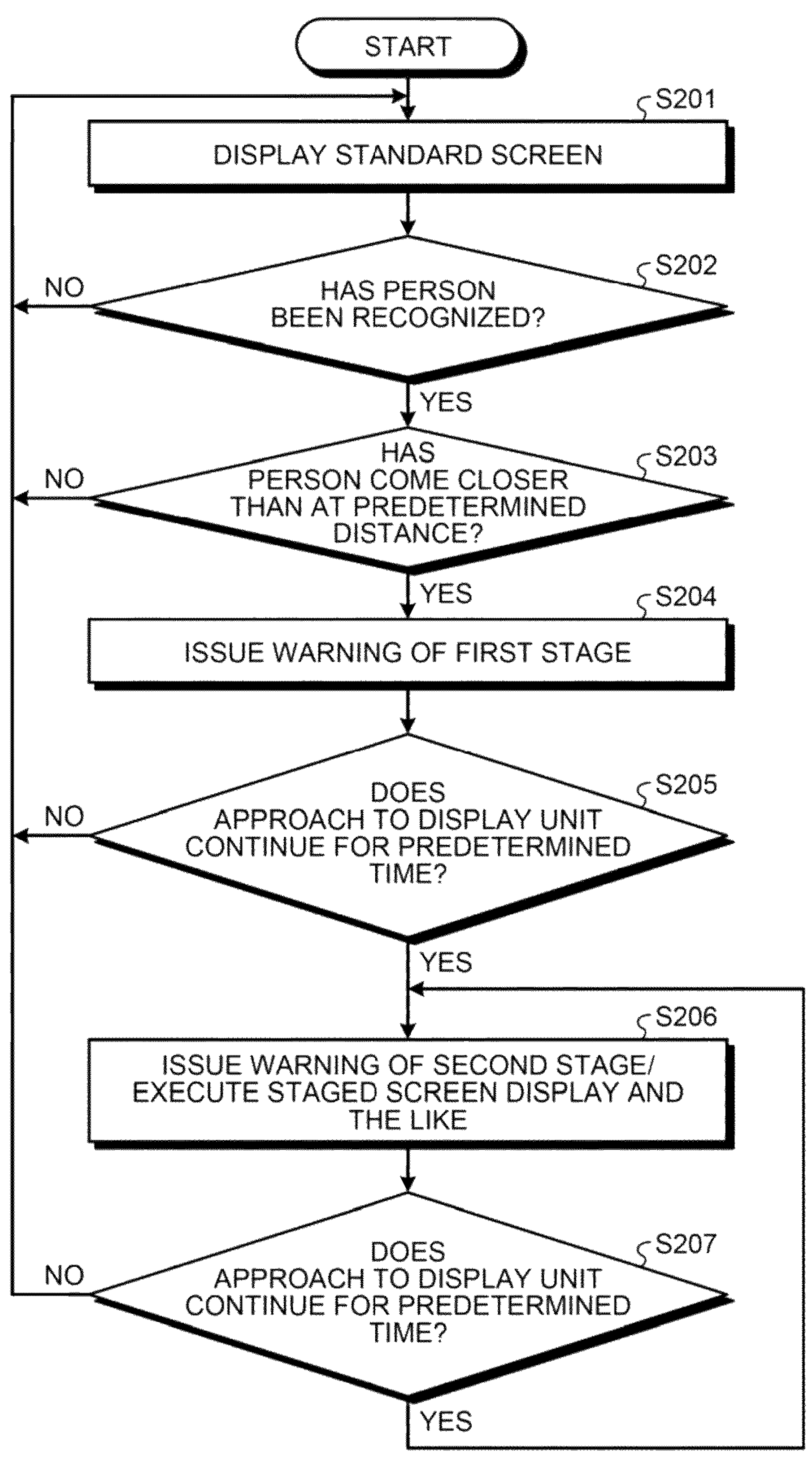
FIG. 11 is a flowchart illustrating a flow of the display processing according to the embodiment.

As illustrated in FIG. 11, the display device 100 performs control so that the display unit 20 displays a standard screen in a state before the display processing is performed (Step S201). Then, the display device 100 constantly captures an image with the camera 10 disposed near the display unit 20, and determines whether or not a person has been recognized based on the captured image (Step S202). When the person has not been recognized (Step S202; No), the display device 100 continues to display a standard screen.

In contrast, when the person has been recognized (Step S202; Yes), the display device 100 determines whether or not the person has come closer to the display unit 20 than at a predetermined distance (Step S203). When the person has not come closer than at the predetermined distance (Step S203; No), the display device 100 continues to display the standard screen.

In contrast, when the person has come closer to the display unit 20 beyond the predetermined distance (Step S203, Yes), the display device 100 issues a warning of the first stage (Step S204). For example, the display device 100 displays only a part of the warning screen in the lower portion of the display unit 20, and prompts the person to move away from the display unit 20.

Thereafter, the display device 100 determines whether or not approach to the display unit 20 continues for a predetermined time (Step S205). When the approach to the display unit 20 is canceled during a predetermined time (e.g., three seconds) (Step S205; No), the display device 100, for example, deletes the warning screen, and returns to the display of the standard screen.

In contrast, when the approach to the display unit 20 continues (Step S205; Yes), the display device 100 issues a warning of the second stage (Step S206). For example, the display device 100 performs slide processing on a part of the warning screen displayed in the lower portion of the display unit 20, and superimposes the part on the original video. The display device 100 then displays the entire warning screen on the display unit 20.

Thereafter, the display device 100 determines whether or not approach to the display unit 20 continues for a predetermined time (Step S207). Note that the predetermined time in this case may be set to a time different from that in Step S205 (e.g., one second). When the approach to the display unit 20 is canceled during a predetermined time (Step S207; No), the display device 100, for example, deletes the warning screen, and returns to the display of the standard screen.

In contrast, when the approach to the display unit 20 continues (Step S207; Yes), the display device 100 further executes staged screen display and the like for the warning of the second stage (Step S206). For example, the display device 100 performs display processing such as gradually darkening the original video on which the warning screen is superimposed, and makes a transition to a state in which the person has difficulty in visually recognizing the video. This causes the display device 100 to prompt the person to move away from the display unit 20.

Note that, when receiving, from the user, a message that display of the video is to be ended (e.g., when display device 100 serving as television is turned off) or when the cancel button 34 is pressed, the display device 100 ends the display processing.

(1-4. Variation According to Embodiment)

The configuration of the display device 100 described in the above-described embodiment and the display processing according to the embodiment may have various variations.

For example, the display device 100 may measure the distance to the person by using a depth sensor (ToF sensor), an infrared sensor, or the like, instead of measuring the distance based on analysis of an image captured by the camera 10. Furthermore, the display device 100 may acquire map information of space in which the user is located by using a technique such as simultaneous localization and mapping (SLAM) using a depth sensor and an image sensor, and measure a distance to the user based on such information.

Furthermore, the display device 100 may include a plurality of cameras instead of including one camera 10 near the display unit 20. In contrast, a plurality of cameras connected to the display device 100 may cause erroneous recognition. When a plurality of cameras is connected to the display device 100, the display device 100 may adopt a flexible configuration in which only one camera is enabled and an image obtained from the camera is used for processing.

Furthermore, in the embodiment, the display unit 20 has been described as an example of a target to which proximity of the user is prevented. The processing according to the embodiment may be applied to prevention of approach of the user to the display unit 20 but to processing for preventing the user from coming close to a predetermined target near the camera 10.

Figure 12:
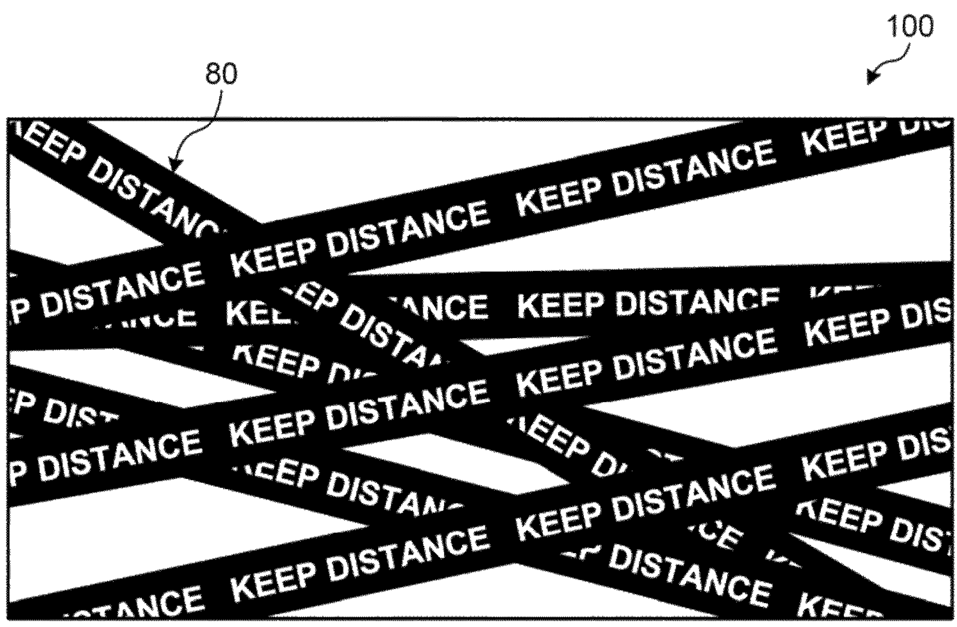
FIG. 12 is a diagram (1) illustrating display processing according to a variation.

Furthermore, the display device 100 may perform not display of the warning frame 30 and the like in FIG. 3 but different piece of screen display processing. One example of such variations will be described with reference to FIG. 12. FIG. 12 is a diagram (1) illustrating display processing according to a variation.

In an example in FIG. 12, the display device 100 displays a superimposed display 80 so as to cover the original video as, for example, the second warning. For example, the superimposed display 80 is in a mode like a tape in which characters giving a warning to move away from the display unit 20 are written. The superimposed display 80 is drawn by animation processing so as to cover a wide range of the video with the elapse of time.

As described above, the display device 100 determines whether or not the user continues to be closer to the display unit 20 than at a predetermined distance for a predetermined time after the first warning was output. Then, when determining that the user continues to be closer to the display unit 20 than at a predetermined distance for a predetermined time, the display device 100 performs, as the second warning to the user, animation display of an object to be superimposed on the video. A range of the object superimposed on the video increases in conjunction with an elapsed time. This enables the display device 100 to inhibit the user from continuing to watch the video and to strongly prompt the user to move away from the display unit 20 beyond the predetermined distance. Note that the display device 100 may output the superimposed display 80 not as the second warning but as the first warning.

Figure 13:
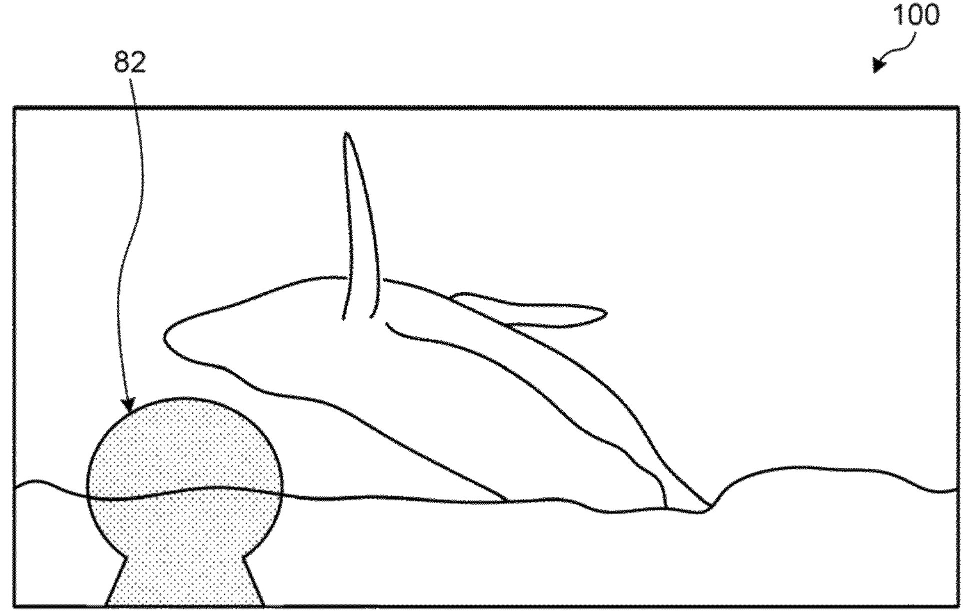
FIG. 13 is a diagram (2) illustrating the display processing according to the variation.

The display device 100 may perform different piece of screen display processing in addition to that in the example in FIG. 12. One example of the variation will be described with reference to FIG. 13. FIG. 13 is a diagram (2) illustrating the display processing according to the variation.

In an example in FIG. 13, the display device 100 superimposes and displays a shadow 82 corresponding to the user on a video as, for example, the second warning. The shadow 82 is an object corresponding to the user imaged by the camera 10, and is, for example, a silhouette that moves in conjunction with the movement of the user imaged by the camera 10. In this case, it is presumed that the user feels as if the video is hidden due to the action of the user himself/herself and the user is thus motivated to move away from the display unit 20.

As described above, when determining that the user continues to be closer to the display unit 20 than at a predetermined distance for a predetermined time, the display device 100 displays the shadow 82 as the second warning to the user. The shadow 82 is an object superimposed on the video in conjunction with operation information of the user acquired by the camera 10. This enables the display device 100 to prompt the user to delete the shadow 82 which obstructs video watching, that is, to prompt the user to move away from the display unit 20 beyond a predetermined distance.

Figure 14:
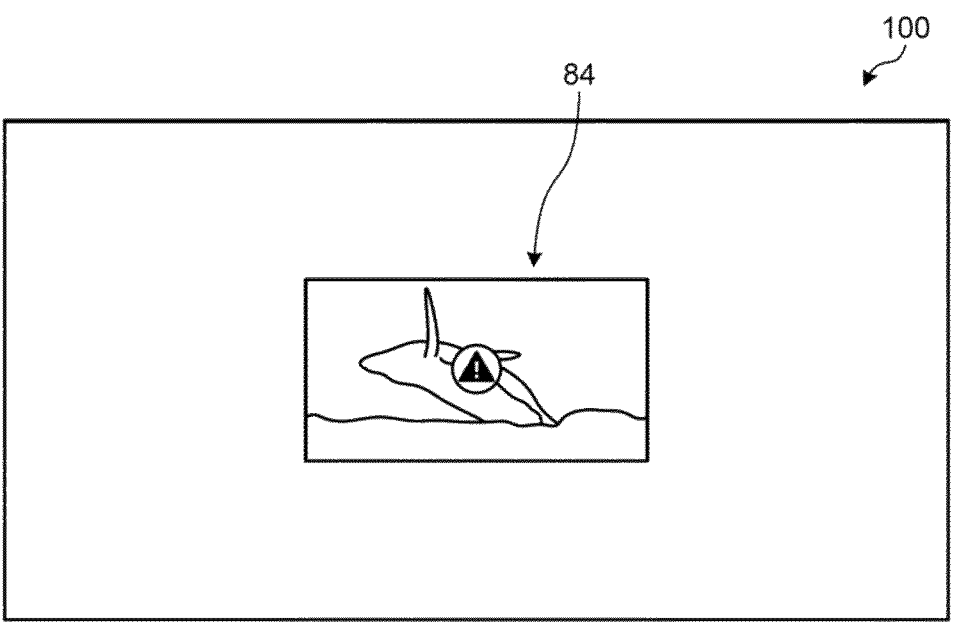
FIG. 14 is a diagram (3) illustrating the display processing according to the variation.

Moreover, the display device 100 may perform different piece of screen display processing in addition to that in the example in FIG. 13. One example of the variation will be described with reference to FIG. 14. FIG. 14 is a diagram (3) illustrating the display processing according to the variation.

In an example in FIG. 14, the display device 100 performs processing of reducing an original video with the elapse of time as, for example, the second warning. A video 84 in FIG. 14 is an original video reduced with the elapse of time. In this case, the video is gradually narrowed. The user has difficulty in continuing to watch the video even if trying to continue the watching. In this case, the display device 100 may perform animation processing in which the video gradually moves away to the back of the screen.

As described above, when determining that the user continues to be closer to the display unit 20 than at a predetermined distance for a predetermined time, the display device 100 may perform control so that a range in which the video is displayed is narrowed in conjunction with an elapsed time. This enables the display device 100 to prompt the user to move away from the display unit 20 beyond a predetermined distance in order to continue to watch the video.

Figure 15:
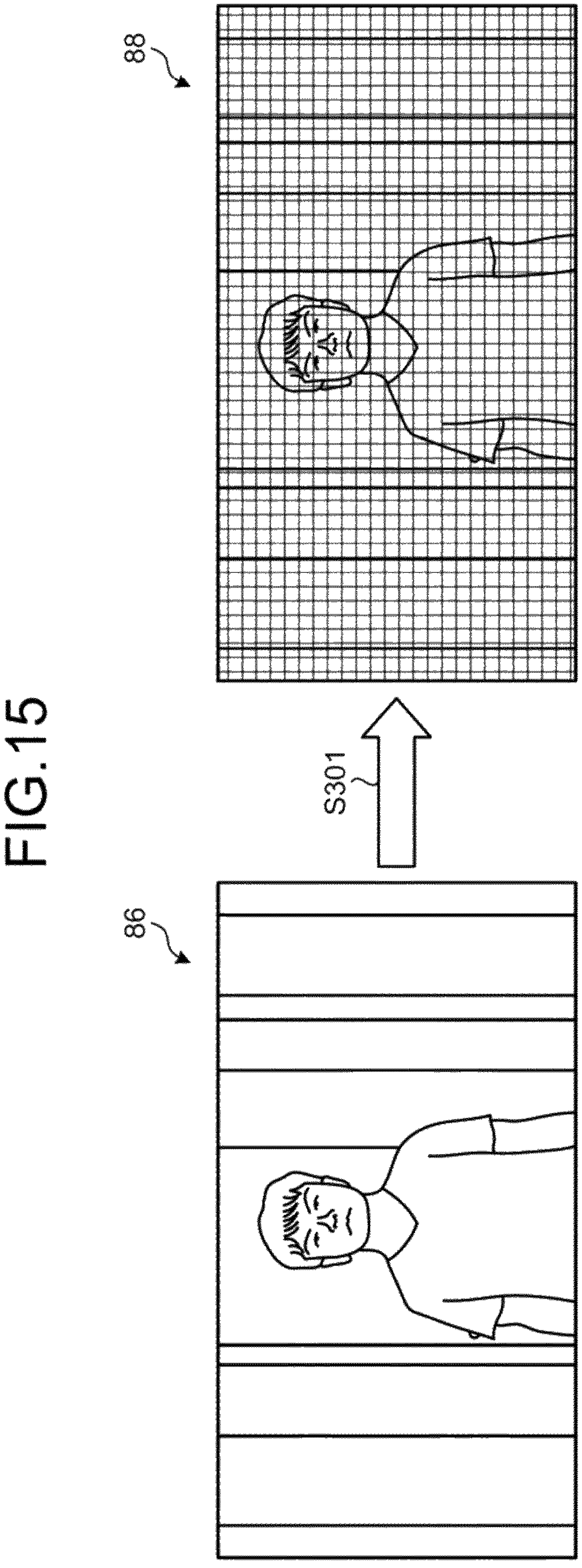
FIG. 15 is a diagram (1) illustrating measurement processing according to the variation.

Furthermore, in the measurement processing, the display device 100 may perform some pieces of performance processing of prompting the user to perform measurement. Such an example will be described with reference to FIG. 15. FIG. 15 is a diagram (1) illustrating measurement processing according to the variation.

In an example in FIG. 15, the display device 100 measures a distance to a person displayed in a captured image 86. Then, the display device 100 performs processing of measuring the distance to the user while displaying the image 86 on the display unit 20 such that the user can visually recognize the image 86 (Step S301).

At this time, the display device 100 may display an image 88 during the measurement. In the image 88, grid display is superimposed on the original image by animation processing. The user can watch display transition from the image 86 to the image 88 on a user interface. The display device 100 can amuse the user during measurement and motivate the user to actively perform the measurement by applying such a visual effect.

Figure 16:
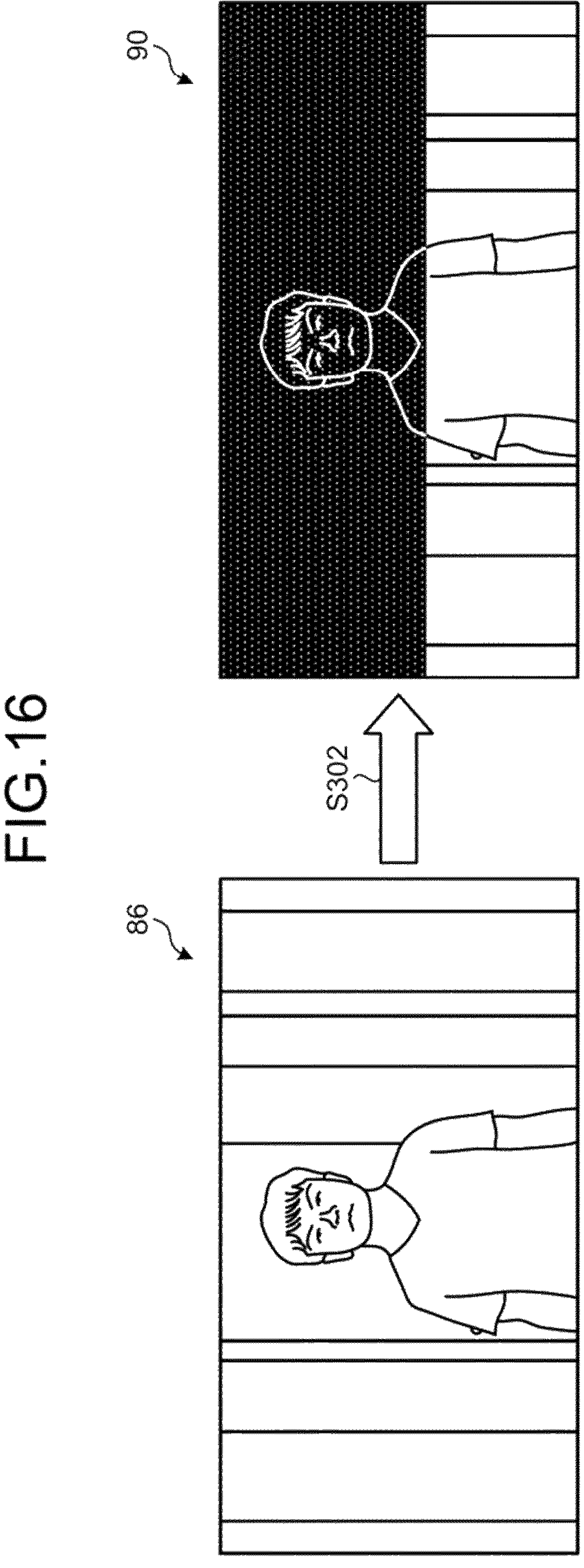
FIG. 16 is a diagram (2) illustrating the measurement processing according to the variation.

Furthermore, the display device 100 may perform different piece of screen display processing in addition to that in the example in FIG. 15. One example of the variation will be described with reference to FIG. 16. FIG. 16 is a diagram (2) illustrating the measurement processing according to the variation.

In an example in FIG. 16, as in the example of FIG. 15, the display device 100 measures a distance to the person displayed in the captured image 86. Then, the display device 100 performs processing of measuring the distance to the user while displaying the image 86 on the display unit 20 such that the user can visually recognize the image 86 (Step S302).

At this time, the display device 100 may display an image 90 during the measurement. In the image 90, scanning lines of scanning the image 86 from the upper portion are superimposed on the original image by animation processing. The user can watch display transition from the image 86 to the image 90 on a user interface that displays an image obtained by imaging the user himself/herself.

That is, as illustrated in FIGS. 15 and 16, when displaying a result of measuring a distance from the user located in a detection range of the camera 10 to the display unit 20 on the user interface, the display device 100 performs effect processing of indicating the progress of the measurement to the user recognized in the image. The display device 100 can amuse the user during measurement while accurately telling the user which person in the image has been recognized by the display device 100 by applying such a visual effect. Therefore, the display device 100 can avoid problems such as performing erroneous measurement and setting an unnatural distance as a predetermined distance.

2. Other Embodiments

The processing according to the above-described embodiment may be conducted in various forms different from the form of the above-described embodiment.

Furthermore, among pieces of processing described in the above-described embodiment, all or part of the processing described as being performed automatically can be performed manually, or all or part of the processing described as being performed manually can be performed automatically by a known method. In addition, the processing procedures, the specific names, and information including various pieces of data and parameters in the above-described document and drawings can be optionally changed unless otherwise specified. For example, various pieces of information in each figure are not limited to the illustrated information.

Furthermore, each component of each illustrated device is functional and conceptual, and does not necessarily need to be physically configured as illustrated. That is, the specific form of distribution/integration of each device is not limited to the illustrated one, and all or part of the device can be configured in a functionally or physically distributed/integrated manner in any unit in accordance with various loads and use situations.

Furthermore, the above-described embodiment and variations thereof can be appropriately combined as long as the processing contents do not contradict each other.

Furthermore, the effects described in the present specification are merely examples and not limitations. Other effects may be exhibited.

3. Effects of Display Device According to Present Disclosure

As described above, the display device (display device 100 in embodiment) according to the present disclosure includes a display control unit (display control unit 131 in embodiment), a determination unit (determination unit 133 in embodiment), and an output control unit (output control unit 134 in embodiment). The display control unit displays a video on a display unit (display unit 20 in embodiment). The determination unit determines whether or not a person visually recognizing the display unit is closer to the display unit than at a predetermined distance based on information acquired by a sensor. When the determination unit determines that the person is closer to the display unit than at a predetermined distance, the output control unit outputs the first warning to the person.

As described above, the display device according to the present disclosure can more effectively inhibit the person from approaching the display unit by determining proximity of the person visually recognizing a video to the display unit and issuing a warning to the person.

Furthermore, the determination unit determines whether or not the person is closer to the display unit than at a predetermined distance based on analysis of an image captured by an image sensor (camera 10 in embodiment).

As described above, the display device recognizes the person based on image analysis and determines the distance between the recognized person and the display unit, so that the display device can exclude approach of an object other than a human such as an animal and can accurately determine approach of a person.

Furthermore, the determination unit may determine whether or not the person is visually recognizing the display unit based on estimation of the skeleton of the person recognized in the image. When the determination unit determines that the person is closer to the display unit than at a predetermined distance and determines that the person is visually recognizing the display unit, the output control unit outputs the first warning to the person.

As described above, the display device can exclude a person or the like simply passing in front of the display unit from the determination target by estimating the skeleton of the person, so that the display device can reliably issue a warning only to the person visually recognizing the video.

Furthermore, after the first warning is output, the output control unit outputs, as the second warning, the first warning screen (meaning entire warning screen. In the embodiment, the warning frame 30 entirely displayed as in FIG. 3 corresponds to the first warning screen) on which an instruction to move away from the display unit is displayed based on the information acquired by the sensor. Furthermore, after the first warning is output, the output control unit outputs the second warning screen (meaning part of warning screen. In the embodiment, the warning frame 30 in FIG. 2 corresponds to the second warning screen) having a display area smaller than the first warning screen on which an instruction to move away from the display unit is displayed so that the second warning screen is superimposed on at least a part of the video displayed on the display unit 20 based on information acquired by the sensor. Furthermore, the second warning screen corresponds to a part of the first warning screen.

As described above, the display device can prompt the person to move away from the display unit without hindering watching of the video by displaying only a part of the warning screen as the first warning. Furthermore, the display device can more effectively inhibit the approach by giving a staged warning than in a case where a warning is simply issued.

Furthermore, the determination unit determines whether or not the person continues to be closer to the display unit than at a predetermined distance for a predetermined time after the first warning was output. When the determination unit determines that the person continues to be closer to the display unit than at a predetermined distance for a predetermined time, the output control unit outputs the second warning to the person.

As described above, the display device can more effectively inhibit the approach by giving a staged warning than in a case where a warning is simply issued.

Furthermore, the output control unit outputs, as the second warning, the first warning screen so that the first warning screen is superimposed on at least a part of a video displayed on the display unit. The first warning screen is the entire warning screen on which the instruction to move away from the display unit is displayed.

As described above, the display device can more strongly prompt the person to move away from the display unit than in a state in which a part is displayed by displaying the entire warning screen.

Furthermore, the output control unit outputs a voice instruction (voice 42 in embodiment) to move away from the display unit together with the first warning screen.

As described above, the display device can strongly prompt the person to move away from the display unit by emitting a voice together with the warning screen.

Furthermore, the output control unit outputs the first warning screen on the display unit together with animation display in which the second warning screen is moved. The first warning screen is the entire warning screen on which an instruction to move away from the display unit is displayed. The second warning screen has been only partially displayed on the display unit.

As described above, the display device can make the person strongly aware of moving away from the display unit by outputting the entire warning screen on the display unit together with a screen effect such as the animation display.

Furthermore, the determination unit determines whether or not the person has moved to a position more away from the display unit than at a predetermined distance after the second warning was output. When the determination unit determines that the person has not moved to a position more away from the display unit than at a predetermined distance, the output control unit performs filter processing in conjunction with the elapse of time on the video on which the first warning screen is superimposed.

As described above, when the person continues to be close to the display unit, the display device lowers visibility of the video by performing filter processing such as lowering the luminance of the video. This enables the display device to strongly prompt the person to move away from the display unit.

Furthermore, the output control unit displays a virtual video as the warning screen while causing a character to perform an animation operation in conjunction with a real distance between the person and the display unit. The virtual video contains the character (character 36 in embodiment) corresponding to the person, the first object, and the second object (appropriate position display 38 in embodiment). The first object corresponds to the display unit. The second object indicates a position more away from the display unit than at a predetermined distance.

As described above, the display device can effectively prompt the person to leave the vicinity of the display unit by performing animation display in conjunction with the person and prompting the person to move along the display.

Furthermore, the determination unit determines whether or not the person has moved to a position more away from the display unit than at a predetermined distance after the second warning was output. When the determination unit determines that the person has moved to a position more away from the display unit than at a predetermined distance, the output control unit moves the character to the second object in the virtual video in conjunction with the movement while performing predetermined effect processing on the second object.

As described above, the display device performs processing such as blinking the second object at the time when the person moves, so that the display device can effectively prompt a child or the like amused by the processing to leave the vicinity of the display unit.

Furthermore, the determination unit determines whether or not the person has moved to a position more away from the display unit than at a predetermined distance after the second warning was output. When the determination unit determines that the person has moved to a position more away from the display unit at a predetermined distance, the output control unit deletes the warning screen from the display unit together with animation display in which the warning screen is moved to the outside of the display unit.

As described above, the display device can effectively prompt the person to leave the vicinity of the display unit by deleting the warning screen at the time when the person moves away from the display unit and returning the original video.

Furthermore, when displaying a warning screen and then receiving a request to stop output of the warning via the warning screen, the output control unit deletes the warning screen from the display unit.

As described above, the display device can eliminate a trouble in which a warning screen is output in an unnecessary situation by deleting the warning screen in response to the request.

Furthermore, the display device further includes a measurement unit (measurement unit 132 in embodiment). When receiving a measurement request, the measurement unit measures a distance from a person located in a detection range of a sensor to the display unit, and sets the measured distance as a predetermined distance based on information acquired by the sensor. The determination unit determines whether or not a person visually recognizing the display unit is closer to the display unit than at a predetermined distance by using the distance set by the measurement unit as a predetermined distance. Furthermore, when receiving a predetermined distance setting request after the measurement, the measurement unit sets the measured distance as the predetermined distance.

As described above, the display device can optionally set a predetermined distance serving as a reference of proximity in accordance with a request from the person. This enables the display device to give a warning in accordance with a daily life mode and the like for each person.

Furthermore, when receiving a measurement request, the measurement unit measures the distance from the person located in the detection range of the image sensor to the display unit based on analysis of an image captured by the image sensor.

As described above, the display device can quickly and accurately measure the distance to the person by measuring the distance based on the image analysis.

Furthermore, the measurement unit receives a predetermined distance setting request via a user interface displayed on the display unit. The user interface contains an image captured by the image sensor and a result of measuring the distance from the person located in the detection range of the sensor to the display unit. The result is superimposed on the image.

As described above, the display device enables the person to visually recognize the captured image to enable the person to perform a setting procedure that is visually easy to understand.

Furthermore, when displaying a result of measuring a distance from the person located in a detection range of the sensor to the display unit on the user interface, the measurement unit performs effect processing indicating the progress of the measurement to the person recognized in the image.

As described above, the display device can provide a setting procedure involving visual performance to the person by performing effect processing such as scanning the person.

Furthermore, the display device further includes an image sensor (camera 10 in embodiment) serving as the sensor. The image sensor images a direction facing the display unit, and is disposed so as to be close to the display unit. The determination unit determines whether or not the person is closer to the display unit than at a predetermined distance based on analysis of an image captured by the provided image sensor.

As described above, the display device may have a configuration in which an image sensor is provided in a host device. This enables the display device to accurately recognize a person who comes close to the host device.

4. Hardware Configuration

Figure 17:
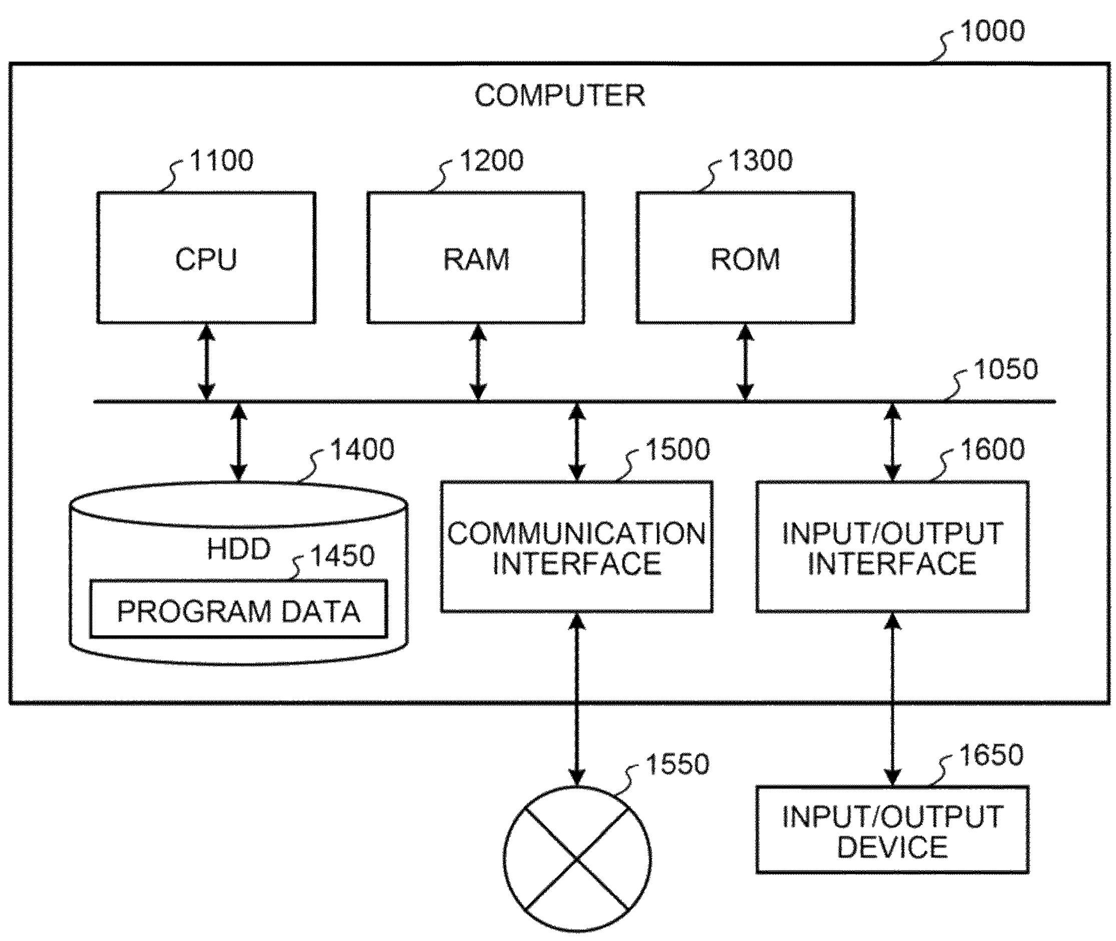
FIG. 17 is a hardware configuration diagram illustrating one example of a computer that implements the function of the display device.

Information equipment such as the display device 100 according to the above-described embodiment is implemented by a computer 1000 having a configuration as illustrated in FIG. 17, for example. The display device 100 according to the present disclosure will be described below as an example. FIG. 17 is a hardware configuration diagram illustrating one example of the computer 1000 that implements the function of the display device 100. The computer 1000 includes a CPU 1100, a RAM 1200, a read only memory (ROM) 1300, a hard disk drive (HDD) 1400, a communication interface 1500, and an input/output interface 1600. Units of the computer 1000 are connected by a bus 1050.

The CPU 1100 operates based on a program stored in the ROM 1300 or the HDD 1400, and controls each unit. For example, the CPU 1100 develops the program stored in the ROM 1300 or the HDD 1400 on the RAM 1200, and executes processing corresponding to various programs.

The ROM 1300 stores a boot program such as a basic input output system (BIOS) executed by the CPU 1100 at the time when the computer 1000 is started, a program depending on the hardware of the computer 1000, and the like.

The HDD 1400 is a computer-readable recording medium that non-transiently records a program executed by the CPU 1100, data used by the program, and the like. Specifically, the HDD 1400 is a recording medium that records a display program according to the present disclosure. The program is one example of program data 1450.

The communication interface 1500 connects the computer 1000 with an external network 1550 (e.g., Internet). For example, the CPU 1100 receives data from another piece of equipment, and transmits data generated by the CPU 1100 to the other piece of equipment via the communication interface 1500.

The input/output interface 1600 connects an input/output device 1650 with the computer 1000. For example, the CPU 1100 receives data from an input device such as a keyboard and a mouse via the input/output interface 1600. Furthermore, the CPU 1100 transmits data to an output device such as a display, a speaker, and a printer via the input/output interface 1600. Furthermore, the input/output interface 1600 may function as a medium interface that reads a program and the like recorded in a predetermined recording medium. The medium includes, for example, an optical recording medium such as a digital versatile disc (DVD) and a phase change rewritable disk (PD), a magneto-optical recording medium such as a magneto-optical disk (MO), a tape medium, a magnetic recording medium, and a semiconductor memory.

For example, when the computer 1000 functions as the display device 100 according to the embodiment, the CPU 1100 of the computer 1000 implements the functions of the control unit 130 and the like by executing a display program loaded on the RAM 1200. Furthermore, the HDD 1400 stores a display program according to the present disclosure and data in the storage unit 120. Note that the CPU 1100 reads the program data 1450 from the HDD 1400 and executes the program data 1450. In another example, the CPU 1100 may acquire these programs from another device via the external network 1550.

Note that the present technique can also have configurations as follows.

(1) A display device comprising:
 a display control unit that displays a video on a display unit;
 a determination unit that determines whether or not a person visually recognizing the display unit is closer to the display unit than at a predetermined distance based on information acquired by a sensor; and
 an output control unit that outputs a first warning to the person when the determination unit determines that the person is closer to the display unit than at a predetermined distance.

(2) The display device according to (1),
 wherein, after the first warning is output, the output control unit outputs a first warning screen on which an instruction to move away from the display unit is displayed as a second warning based on information acquired from the sensor.

(3) The display device according to (2),
 wherein the output control unit outputs, as the first warning, a second warning screen having a smaller display area than the first warning screen so that the second warning screen is superimposed on at least a part of the video displayed on the display unit.

(4) The display device according to (3),
 wherein the second warning screen corresponds to a part of the first warning screen.

(5) The display device according to any one of (2) to (4),
 wherein the determination unit determines whether or not the person continues to be closer to the display unit than at a predetermined distance for a predetermined time after the first warning is output, and
 the output control unit outputs a second warning to the person when the determination unit determines that the person continues to be closer to the display unit than at a predetermined distance for a predetermined time.

(6) The display device according to (4),
 wherein the output control unit outputs a first warning screen as the second warning so that the first warning screen is superimposed on at least a part of the video displayed on the display unit, the first warning screen being an entire warning screen on which an instruction to move away from the display unit is displayed.

(7) The display device according to any one of (2) to (6),
 wherein the output control unit outputs a voice instruction to move away from the display unit together with the first warning screen.

(8) The display device according to (6),
 wherein the output control unit outputs a first warning screen on the display unit together with animation display in which the second warning screen is moved, the first warning screen being an entire warning screen on which an instruction to move away from the display unit is displayed, the second warning screen having been only partially displayed on the display unit.

(9) The display device according to (5), wherein the determination unit determines whether or not the person has moved to a position more away from the display unit than at a predetermined distance after the second warning is output, and the output control unit performs filter processing in conjunction with elapse of time on a video on which the first warning screen is superimposed when the determination unit determines that the person has not moved to a position more away from the display unit than at a predetermined distance.

(10) The display device according to any one of (2) to (9), wherein the output control unit displays a virtual video as the first warning screen while causing a character corresponding to the person to perform an animation operation in conjunction with a real distance between the person and the display unit, the virtual video containing the character, a first object corresponding to the display unit, and a second object indicating a position more away from the display unit than at a predetermined distance.

(11) The display device according to (10), wherein the determination unit determines whether or not the person has moved to a position more away from the display unit than at a predetermined distance after the second warning is output, and the output control unit moves the character to the second object in the virtual video in conjunction with a movement while performing predetermined effect processing on the second object when the determination unit determines that the person has moved to a position more away from the display unit than at a predetermined distance.

(12) The display device according to any one of (1) to (11), further comprising a measurement unit that, when receiving a measurement request, measures a distance from a person located in a detection range of the sensor to the display unit based on information acquired by the sensor and sets the distance that has been measured as the predetermined distance, wherein the determination unit determines whether or not a person visually recognizing the display unit is closer to the display unit than at the predetermined distance by using the distance set by the measurement unit as the predetermined distance.

(13) The display device according to (12), wherein, when receiving the measurement request, the measurement unit measures a distance from a person located in a detection range of an image sensor to the display unit based on analysis of an image captured by the image sensor.

(14) The display device according to (13), wherein, when receiving a predetermined distance setting request after measurement, the measurement unit sets the distance that has been measured as the predetermined distance.

(15) The display device according to (14), wherein, the measurement unit receives the predetermined distance setting request via a user interface displayed on the display unit, the user interface containing an image captured by the image sensor and a result of measuring a distance from a person located in a detection range of the sensor to the display unit, the result being superimposed on the image.

(16) The display device according to any one of (1) to (15), wherein the determination unit determines whether or not the person is closer to the display unit than at a predetermined distance based on analysis of an image captured by an image sensor.

(17) The display device according to (16), wherein the determination unit determines whether or not a person recognized in the image is visually recognizing the display unit based on estimation of a skeleton of the person, and the output control unit outputs a first warning to the person when the determination unit determines that the person is closer to the display unit than at a predetermined distance and that the person is visually recognizing the display unit.

(18) The display device according to (16) or (17), further comprising an image sensor that is disposed so as to be close to the display unit and that images a direction facing the display unit, wherein the determination unit determines whether or not the person is closer to the display unit than at a predetermined distance based on analysis of an image captured by the image sensor that is provided.

(19) A display method comprising:

by a computer, displaying a video on a display unit;

determining whether or not a person visually recognizing the display unit is closer to the display unit than at a predetermined distance based on information acquired by a sensor; and outputting a first warning to the person when it is determined, in the determining, that the person is closer to the display unit than at a predetermined distance.

(20) A display program causing a computer to function as:

a display control unit that displays a video on a display unit;

a determination unit that determines whether or not a person visually recognizing the display unit is closer to the display unit than at a predetermined distance based on information acquired by a sensor; and an output control unit that outputs a first warning to the person when the determination unit determines that the person is closer to the display unit than at a predetermined distance.

REFERENCE SIGNS LIST

10 CAMERA
20 DISPLAY UNIT
100 DISPLAY DEVICE
110 COMMUNICATION UNIT
120 STORAGE UNIT
121 SETTING STORAGE UNIT
122 WARNING INFORMATION STORAGE UNIT
130 CONTROL UNIT
131 DISPLAY CONTROL UNIT
132 MEASUREMENT UNIT
133 DETERMINATION UNIT
134 OUTPUT CONTROL UNIT
140 DETECTION UNIT
150 OUTPUT UNIT

The invention claimed is:

1. A display device comprising:

a display configured to display a video; and circuitry configured to:

determine whether or not a person visually recognizing the display is closer to the display than at a predetermined distance based on information acquired by a sensor, output a first warning to the person when it is determined that the person is closer to the display than at the predetermined distance, output, after the first warning is output, a first warning screen on which an instruction to move away from the display is displayed as a second warning based on the information acquired from the sensor, and output, as the first warning, a second warning screen having a smaller display area than the first warning screen so that the second warning screen is superimposed on at least a part of the video displayed on the display.

2. The display device according to claim 1, wherein the circuitry is further configured to determine whether or not the person continues to be closer to the display than at the predetermined distance for a predetermined time after the first warning is output.

3. The display device according to claim 2, wherein the second warning screen corresponds to a part of the first warning screen.

4. The display device according to claim 1, wherein the second warning screen corresponds to a part of the first warning screen.

5. The display device according to claim 2, wherein the circuitry is further configured to output the second warning to the person when it is determined that the person continues to be closer to the display than at the predetermined distance for the predetermined time.

6. The display device according to claim 1, wherein the circuitry is further configured to output the first warning screen as the second warning so that the first warning screen is superimposed on at least a part of the video displayed on the display, the first warning screen being an entire warning screen on which the instruction to move away from the display is displayed.

7. The display device according to claim 1, wherein the circuitry is further configured to output a voice instruction to move away from the display together with the first warning screen.

8. The display device according to claim 6, wherein the circuitry is further configured to output the first warning screen on the display together with animation display in which the second warning screen is moved, the first warning screen being the entire warning screen on which the instruction to move away from the display is displayed, the second warning screen having been only partially displayed on the display.

9. The display device according to claim 5, wherein the circuitry is further configured to determine whether or not the person has moved to a position further from the display than at the predetermined distance after the second warning is output, and the circuitry is further configured to perform filter processing in conjunction with elapse of time on the video on which the first warning screen is superimposed when it is determined that the person has not moved to a position further from the display than at the predetermined distance.

10. The display device according to claim 1, wherein the circuitry is further configured to display a virtual video as the first warning screen while causing a character corresponding to the person to perform an animation operation in conjunction with a real distance between the person and the display, the virtual video containing the character, a first object corresponding to the display and a second object indicating a position further from the display than at the predetermined distance.

11. The display device according to claim 10, wherein the circuitry is further configured to determine whether or not the person has moved to a position further from the display than at the predetermined distance after the second warning is output, and the circuitry is further configured to move the character to the second object in the virtual video in conjunction with a movement while performing predetermined effect processing on the second object when it is determined that the person has moved to a position further from the display than at the predetermined distance.

12. The display device according to claim 1, wherein the circuitry is further configured to:

when receiving a measurement request, measure a distance from the person located in a detection range of the sensor to the display based on the information acquired by the sensor and sets the distance that has been measured as the predetermined distance, and determine whether or not the person visually recognizing the display is closer to the display than at the predetermined distance by using the distance set as the predetermined distance.

13. The display device according to claim 12, wherein, when receiving the measurement request, the circuitry is further configured to measure the distance from the person located in a detection range of an image sensor to the display based on analysis of an image captured by the image sensor.

14. The display device according to claim 13, wherein, when receiving a predetermined distance setting request after measurement, the circuitry is further configured to set the distance that has been measured as the predetermined distance.

15. The display device according to claim 14, wherein, the circuitry is further configured to receive the predetermined distance setting request via a user interface displayed on the display, the user interface containing the image captured by the image sensor and a result of measuring a distance from the person located in the detection range of the image sensor to the display, the result being superimposed on the image.

16. The display device according to claim 1, wherein the circuitry is further configured to determine whether or not the person is closer to the display than at the predetermined distance based on analysis of an image captured by an image sensor.

17. The display device according to claim 16, wherein the circuitry is further configured to:

determine whether or not the person recognized in the image is visually recognizing the display based on estimation of a skeleton of the person, and output the first warning to the person when it is determined that the person is closer to the display than at the predetermined distance and that the person is visually recognizing the display.

18. The display device according to claim 16, wherein the image sensor is disposed so as to be close to the display and images in a direction facing the display, the circuitry is further configured to determine whether or not the person is closer to the display than at the predetermined distance based on analysis of the image captured by the image sensor that is provided.

19. A display method comprising:

by a computer, displaying a video on a display;

determining whether or not a person visually recognizing the display is closer to the display than at a predetermined distance based on information acquired by a sensor;

outputting a first warning to the person when it is determined, in the determining, that the person is closer to the display than at the predetermined distance;

outputting, after the first warning is output, a first warning screen on which an instruction to move away from the display is displayed as a second warning based on the information acquired from the sensor; and displaying a virtual video as the first warning screen while causing a character corresponding to the person to perform an animation operation in conjunction with a real distance between the person and the display, the virtual video containing the character, a first object corresponding to the display, and a second object indicating a position further from the display than at the predetermined distance.

20. A non-transitory computer-readable storage medium having a display program stored therein causing a computer to perform a method comprising:

displaying a video on a display;

determining whether or not a person visually recognizing the display is closer to the display than at a predetermined distance based on information acquired by a sensor;

outputting a first warning to the person when it is determined that the person is closer to the display than at the predetermined distance;

determining whether or not the person has moved to a position further from the display than at the predetermined distance after a second warning is output; and performing filter processing in conjunction with elapse of time on a video on which a first warning screen is superimposed when it is determined that the person has not moved to a position further from the display than at the predetermined distance.

* * * * *